(12) United States Patent
Brown et al.

(10) Patent No.: US 11,981,512 B2
(45) Date of Patent: May 14, 2024

(54) SUBSTRATE SUPPORT SYSTEM FOR A CONVEYOR PRINTER

(71) Applicant: Inca Digital Printers Limited, Cambridge (GB)

(72) Inventors: Andrew James Brown, Cambridge (GB); Anderson McKeague, Cambridge (GB)

(73) Assignee: Inca Digital Printers Limited, Cambridge (GB)

( * ) Notice: Subject to any disclaimer, the term of this patent is extended or adjusted under 35 U.S.C. 154(b) by 280 days.

(21) Appl. No.: 17/720,597

(22) Filed: Apr. 14, 2022

(65) Prior Publication Data

US 2022/0332510 A1 Oct. 20, 2022

(30) Foreign Application Priority Data

Apr. 14, 2021 (GB) ..................................... 2105334

(51) Int. Cl.
*B65G 21/20* (2006.01)
*B65G 15/30* (2006.01)
*B65G 49/06* (2006.01)

(52) U.S. Cl.
CPC ......... *B65G 21/2036* (2013.01); *B65G 15/30* (2013.01); *B65G 49/061* (2013.01); *B65G 49/065* (2013.01); *B65G 2201/0297* (2013.01)

(58) Field of Classification Search
CPC .......... B65G 49/061; B65G 2201/0297; B65G 15/30; B65G 49/065
See application file for complete search history.

(56) References Cited

U.S. PATENT DOCUMENTS 3,889,801 A 6/1975 Boyer
5,561,918 A 10/1996 Marschke
(Continued)

FOREIGN PATENT DOCUMENTS

WO 2013150677 A 10/2013
WO 2017154881 A1 9/2017

OTHER PUBLICATIONS

Great Britain Combined Search and Examination Report under Sections 17 and 18(3), Application No. GB2105334.3, dated Oct. 1, 2021.

(Continued)

*Primary Examiner* — Gene O Crawford
*Assistant Examiner* — Lester Rushin, III
(74) *Attorney, Agent, or Firm* — MacMillan, Sobanski & Todd, LLC

(57) ABSTRACT

A substrate support system 10 for a conveyor printer is provided, comprising a support unit 100 comprising a plurality of vacuum apertures 108 arranged for fluidic communication with a source of negative pressure. The support unit 100 also comprises at least one air bearing 114 arranged for fluidic communication with a source of positive pressure. The air bearing 114 comprises porous media 116. The substrate support system 10 also comprises a conveyor belt 150 arranged over the support unit 100 for supporting a substrate 170 to be printed on. The conveyor belt 150 comprises a plurality of belt apertures. The vacuum apertures 108 are arranged to convey a negative pressure through the belt apertures for retaining the substrate 170 on the conveyor belt 150. The at least one air bearing 114 is arranged to convey a positive pressure to support the conveyor belt 150.

20 Claims, 8 Drawing Sheets

(56) References Cited

U.S. PATENT DOCUMENTS

| | | | |
|---|---|---|---|
| 5,779,236 A | | 7/1998 | Duncan, Jr. et al. |
| 6,808,358 B1 * | | 10/2004 | Mayerberg, II ........ B65H 5/021 |
| | | | 406/87 |
| 9,346,641 B2 * | | 5/2016 | Herrmann ............ B41J 11/0085 |
| 9,505,245 B2 * | | 11/2016 | Lowrance ................ B41J 11/06 |
| 2016/0031663 A1 | | 2/2016 | Herrmann |
| 2020/0324558 A1 | | 10/2020 | Herrmann et al. |
| 2021/0008901 A1 | | 1/2021 | Terrero et al. |
| 2022/0338483 A1 * | | 10/2022 | Fülbier .................... A21B 1/46 |

OTHER PUBLICATIONS

The Extended European search report, Application No. 22168545.6, dated Sep. 16, 2022.

\* cited by examiner

SUBSTRATE SUPPORT SYSTEM FOR A CONVEYOR PRINTER

The present disclosure relates to a substrate support system for a conveyor printer. The present disclosure also relates to a method for using the substrate support system.

Substrate support units are typically used for conveyor printers for supporting the conveyor belt, on which a substrate rests. The conveyor belt moves over a support surface of the support unit to feed a substrate to an array of printheads for printing. As the conveyor belt moves over the support surface, friction is generated resulting in heat, especially at high conveyor speeds. These high temperatures can cause wear to the conveyor belt, and may affect print quality.

Vacuum apertures are typically used for maintaining a substrate in a fixed position on printer tables, including for conveyor printers. The conveyor belt is typically perforated so that vacuum apertures in the support unit can apply a negative pressure to pull the substrate down onto the conveyor belt. This helps keep the substrate fixed in position, improving print quality. However, using a vacuum to pull down the substrate also inherently acts on the conveyor belt by creating a clamping force and making it more difficult for the belt to move over the support unit. This further exacerbates the problem of friction between the conveyor belt and the support unit. The friction force varies as the substrate comes into and out of contact with the vacuum section of the belt, which tends to alter the belt tracking. This causes alignment problems and thus affects print quality.

The present disclosure attempts to address one or more of the above mentioned problems.

According to a first aspect of the present disclosure, there is provided a substrate support system for a conveyor printer, comprising a support unit comprising: a plurality of vacuum apertures arranged for fluidic communication with a source of negative pressure; and at least one air bearing arranged for fluidic communication with a source of positive pressure, wherein the air bearing comprises porous media; and a conveyor belt arranged over the support unit for supporting a substrate to be printed on, the conveyor belt comprising a plurality of belt apertures; wherein the vacuum apertures are arranged to convey a negative pressure through the belt apertures for retaining the substrate on the conveyor belt; and wherein the at least one air bearing is arranged to convey a positive pressure to support the conveyor belt.

As used herein, a conveyor printer is preferably a printer which uses a conveyor belt for printing motion, for example by moving a substrate along a conveyor belt and past an array of printheads. Optionally, the conveyor printer comprises an ink-jet printer.

The substrate support system therefore supports a conveyor belt over the support unit by resting the conveyor belt on at least one air bearing. The positive pressure from the at least one air bearing spaces the air bearing away from an upper surface of the support unit. This avoids contact between an underside of the conveyor belt and the upper surface of the support unit. As a result, friction is reduced as the conveyor belt moves over the support unit. This removes heat and also prevents sticking and enables smooth movement of the conveyor belt. In turn, this can improve efficiency, avoid damage to the belt, and also improve print quality.

The vacuum apertures act to retain the substrate on the conveyor belt by applying a negative pressure through the belt apertures. This keeps the substrate fixed in the correct place, improving alignment and thus print quality.

As the at least one air bearing comprises porous media, the at least one bearing may be referred to as a porous media air bearing. The porous media means that a component of the air bearing is porous to air. When air is applied through the porous media, air can permeate through the porous media. This allows air to be supplied from underneath the air bearing, and the air to pass through the porous media to form an air cushion, or an air film, above an upper surface of the air bearing. The conveyor belt can then rest on the air cushion, spaced above the air bearing. In some examples, the porosity of the porous media is between 10% and 20%, measured by density. Porous media air bearings are advantage compared to aperture air bearing because the air consumption is much lower. Aperture air bearings require a high consumption of air and are much less stable. In contrast, the use of porous media air bearings decreases the air flow required, improving efficiency and stability, while reducing cost.

Preferably, the porous media comprise carbon. Carbon has been found to be particularly advantageous as it can provide the desired porosity while also providing stability. Carbon is tolerant and relatively soft, so that it can wear slightly in order to avoid damage to the belt in the event of misalignment. Carbon is also easy to machine and manufacture. In other examples, the porous media comprises a porous metal or plastic, or medium-density fibreboard (MDF). However, carbon is advantageous because other materials often are too porous, leading to a high flow rate which has a high air consumption which reduces efficiency, the high flow rate pushes the belt up too high, and leads to rapid wear and friction damage to the belt. Carbon also has the advantage that plastic often melts and seals the holes, whereas carbon does not.

Optionally, the porous media comprises a mixture including carbon. For example, the porous media may comprise a mixture of amorphous carbon and graphite. This may generally be referred to as carbon-graphite or graphite. In some examples, the porous media may comprise sintered carbon. The grade of carbon may be one or more selected from the list of: MCCA, Y460B, Y552, Y459, or Y464B (each commercially available from Olmec Advanced Materials), or EG-75, EDM-1, or EDM-200 (each commercially available from Entegris POCO Materials).

Preferably, the at least one air bearing is configured to support the conveyor belt on a film of air having a thickness of between 1 μm and 20 μm. This means that the underside of the conveyor belt is supported at a position between 1 μm and 20 μm above an upper surface of the air bearing. More preferably, the film thickness is between 3 μm and 12 μm, even more preferably between 5 μm and 10 μm. This ensures that contact is avoided between the air bearing and the conveyor belt. It is desirable to keep the film thickness greater than the surface roughness in order to avoid contact. Air consumption increases rapidly with film thickness, so it is desirable to keep the film thin. The upper limit avoids a large gap between the air bearing and the conveyor belt, which requires a large airflow to support. This improves efficiency and reduces air consumption.

Preferably, the source of negative pressure is configured to apply a negative pressure of −100 mbarg to −250 mbarg to the vacuum apertures. As such, in some examples the substrate support system comprises the source of negative pressure. As used herein, the term "mbarg" preferably refers to a pressure in units of mbar relative to atmospheric pressure (approximately 101 kPa). The applied negative pressure can be sufficient to act to retain a variety of substrates in position, such as paper or card of varying thicknesses and porosities. In some examples, there may be at least 2000 vacuum apertures per m2. In some examples, each vacuum aperture may supply two belt apertures, but in other examples each vacuum aperture corresponds to each belt aperture.

Preferably, the source of positive pressure is configured to apply a positive pressure of 0.4 MPa to 0.6 MPa to the at least one air bearing. As such, in some examples the substrate support system comprises the source of positive pressure. The applied positive pressure can be sufficient to support a conveyor belt on a film of air to space the conveyor belt away from the at least one air bearing. In some examples, each air bearing having a diameter of 26 mm can support a load of 80 to 125 N with a positive pressure of 0.4 MPa to 0.6 MPa. Using an array of 250 air bearings per m2 means that in some examples the total supported load can be 8.7 to 23 kN, where the minimum supported load is when the 0.4 MPa supply pressure is connected to 50% of the bearings, and the maximum supported load is when the 0.4 MPa supply pressure is connected to 85% of the bearings.

Preferably, a ratio of the flow rate of the negative pressure to the flow rate of the positive pressure is greater than 500 to 1.

Preferably, the at least one air bearing is supported on a resilient member. For example, the resilient member may be in the form of an O-ring. The resilient member is made from a resilient material. The resilient member may be made from a deformable material. In some examples, the resilient member may be made from rubber. The resilient member can deform under the load of the air bearing so that the air bearing can self-align, improving alignment.

Preferably, the at least one air bearing has an upper surface arranged above an upper surface of the support unit. In other words, the air bearing protrudes above the upper surface of the support unit. As the conveyor belt is support on the air bearing, this provides a space between the upper surface of the support unit and the underside of the conveyor belt. The vacuum apertures can be in fluid communication with this space so that a negative pressure is applied in this space.

Preferably, the at least one air bearing is arranged to protrude above the upper surface of the support unit by between 100 μm and 200 μm. This ensures that a small gap is avoided. For example, if the air bearing is flush with the upper surface of the support unit, the gap between the underside of the conveyor belt and the upper surface of the support unit is only the height of the air film, which might typically be around 1 μm to 10 μm. As the at least one air bearing may not be continuous across the upper surface (e.g. in an array of air bearings), the supporting force is lower between air bearings, and therefore the belt can sag between air bearings. By providing the air bearing protruding from the upper surface in this manner, it is ensured that the conveyor belt will not touch the upper surface, even if the belt sags. Additionally, it is beneficial to avoid a large gap as this requires a larger space, requiring a stronger vacuum force to provide the desired effect on the substrate.

Preferably, the upper surface of the at least one air bearing is circular. In other examples, the upper surface has different shapes such as square or rectangular. For example, the air bearing may be shaped to fit between vacuum apertures.

Preferably, the upper surface of the at least one air bearing comprises a slit. The slit is provided to provide a connection to the space between the upper surface of the support unit and the underside of the conveyor belt which is at a negative pressure. This reduces the flow rate of air in the slit. As the slit may align with belt apertures as the conveyor belt passes over the support unit, the slit ensures that there is not a strong positive pressure applied in this region, which would otherwise provide an upward force on the substrate through the belt apertures, reducing the hold down force. As such, the retaining force on the substrate is improved. The slit may be arranged through the centre of the air bearing (i.e. across a width of the air bearing). In one example, the slit extends across a diameter of the air bearing where the air bearing is circular. For example, the slit may have a width of 2 mm. In some examples, the slit has a generally rectangular shape. The slit may have a depth of 0.5 mm. It is desirable for the depth of the slit to be significantly deeper than the air film thickness (which may be for example around 3 to 10 μm). Effectively, the slit allows for the reduction of the number of air bearings, because it splits the air bearing into two effective air bearings either side of the slit. This avoids the need for providing a larger number of smaller air bearings between rows of vacuum apertures.

Preferably, the at least one air bearing comprises a plurality of air bearings arranged in an array. In this way, the air bearings may be interspersed with the vacuum apertures in the upper surface of the support unit. By providing a plurality of discrete air bearings, the conveyor belt can be supported at multiple locations. This improves the uniformity of the supporting force and can reduce sagging of the belt. In some examples, the air bearings are arranged in an offset pattern. In other words, the air bearings are staggered over the upper surface. This avoids the air bearings being arranged in continuous strips along the belt axis. This allows the conveyor belt to be forced to deform into a complex curve over the air bearings, which makes the belt much stiffer than if a simple curve was permitted. In contrast, where air bearings are arranged in non-offset patterns (e.g. continuous strips), the belt may be easier to deform and is not as stiff, reducing printing accuracy. In some examples, the air bearings may be arranged in rows extending in a direction offset from the belt axis (the direction of movement of the conveyor belt). For example, the air bearings may be arranged in rows extending in a direction that forms an angle with the belt axis. For example, the air bearings may be arranged to extend in rows in a diagonal direction.

Preferably, each of the plurality of air bearings cover an area of an upper surface of the support unit of between 250 mm2 and 750 mm2. More preferably, the area is between 450 mm2 and 550 mm2. This provides an optimum surface area for supporting the conveyor belt, while fitting the air bearings between vacuum apertures. In one example, the air bearings are circular and have a diameter of between 20 mm and 30 mm, preferably around 26 mm. This provides an area of around 530 mm2. In examples where a slit is provided, the effective surface area is reduced by the area of the slit because the positive pressure does not act effectively in this region. For a slit across the diameter having a width of 2 mm, the effective area is around 480 mm2.

Preferably, the plurality of air bearings comprise at least 200 air bearings per m2 of the area of an upper surface of the support unit. In one example, there are 225 air bearings per m2. This provides a uniform supporting force on the conveyor belt, avoiding sag of the belt between air bearings.

Preferably, the plurality of air bearings cover between 5% and 20% of the area of an upper surface of the support unit. More preferably, the total area is between 10% and 15%, even more preferably around 12%. This provides the desired supporting force while minimising the number of air bearings.

Preferably, the support unit comprises at least one tile comprising porous media forming the at least one air bearing. In this way, the at least one air bearing is in the form of the at least one tile. In other words, there are no individual discrete air bearings in an array. Instead, the tile itself provides the air bearings. The tile comprises porous media so that the surface of the tile as a whole provides one effective air bearing. This provides a convenient solution as individual air bearings can be avoided, and the system can be manufactured cheaply and easily. The surface area of the porous media is also much larger than providing individual air bearings, which means a higher force can be generated for supporting the conveyor belt. The tile can also provide the vacuum apertures by providing holes in the tile. The upper surface of the tile can then act as the upper surface of the support unit. This results in higher performance and lower cost. This negates the need for close tolerance between the air bearing and the upper surface because the upper surface is defined by the porous media tile. This also allows for use of a thinner steel belt or a plastic belt due to uniform support and lower friction operation due to no velocity stability issues or premature stretch or wear, leading to significantly lower costs.

Preferably, the air bearing covers at least 50% of the area of an upper surface of the support unit. Because the area of the tile comprises porous media, the area can be significantly higher than providing individual air bearings. This improves the uniformity of the supporting force on the belt.

Preferably, the plurality of vacuum apertures each comprise a slot in an upper surface of the support unit and a vacuum feed hole in the base of the slot, wherein the vacuum feed hole is connected to the source of negative pressure. The slots conveys the negative pressure to the belt apertures moving over the upper surface. The slots connect the vacuum feed hole to the space between the conveyor belt and the upper surface defined by the air bearings. In some examples, the slots can have a size and shape complementary to the belt apertures, but in some cases can be slightly wider to accommodate lateral movement of the belt. Because the slots are apertures rather than a porous material, the vacuum force applied can be greater. In other words, because the vacuum can be applied directly through the slots rather than through a porous material, the vacuum force can be stronger. This can increase the strength of the hold-down force for a given pressure, or can improve efficiency, complexity, and cost by reducing the magnitude of the negative pressure required. Instead, by passing a vacuum through a porous material, this would result in wastage and reduce the hold-down force. The volume of the aperture slots thus acts to permit a better vacuum. The combination of porous media air bearings for positive pressure with apertures for negative pressure optimises the supply of positive and negative pressures.

Preferably, the slots of the vacuum apertures extend in a direction parallel to a direction of movement of the conveyor belt.

Preferably, the slots have a width of between 2 and 15 mm. More preferably, the slots have a width of between 3 mm and 10 mm, even more preferably around 5 mm.

Preferably, a pitch between adjacent slots of the vacuum apertures in a direction perpendicular the direction of movement of the conveyor belt is between 5 mm and 20 mm. More preferably, the pitch is between 10 mm and 20 mm, even more preferably between 13 mm and 15 mm.

Preferably, a land between adjacent slots of the vacuum apertures in a direction perpendicular to the direction of movement of the conveyor belt is between 2 mm and 15 mm. More preferably, the land is around 8 mm.

Preferably, the substrate support system further comprises a plurality of valves operable to open and close the plurality of vacuum apertures. For example, the valves may be ball valves using a spring to close and open the vacuum apertures due to a pressure differential based on whether a substrate covers the vacuum aperture. In this way, the vacuum apertures can self-seal to improve the efficiency of the vacuum hold down force.

Preferably, the substrate support system further comprises a sheet comprising: a plurality of valves formed into the sheet; wherein the sheet is made from a resilient material; and wherein each valve comprises a valve head for sealing a respective vacuum aperture in the substrate support unit, and a valve lever arm for permitting movement of the valve head towards and away from the vacuum aperture in order to open and close the valve.

This can provide a sheet of valves for use with the air bearings. The combination of vacuum apertures and air bearings can be supplemented with a convenient sheet of valves for operating the vacuum apertures. In this way, the valves can be operated to move to close the vacuum apertures. This can be effected automatically when a substrate covers the vacuum aperture by causing a pressure differential and the air drag force pulls the valve head down towards the vacuum aperture. The valve lever arm permits the movement of the valve head by bending due to the resilience of the sheet.

This allows a plurality of valves to be used for opening and closing an array of vacuum apertures in a substrate support unit of a printer. For example, the printer may be an ink-jet printer. The printer may be a flat-bed printer. In other examples, the printer may be a conveyor printer which uses a conveyor belt to move a substrate past a printhead in a printing motion. For example, the substrate may comprise paper or cardboard. The sheet provides a simple and cheap solution which avoids the need for ineffective masking. For conveyor printers, masking is not possible, so this avoids the need for complex ball valves. The sheet can be rapidly produced simply by forming the valves from the sheet, such as by cutting. This allows for rapid production and prototyping, and permits easy and fast replacement, limiting downtime of the printer.

Preferably, the resilient material comprises a plastic.

Preferably, the plastic comprises BoPET. In other examples, the resilient material comprises polyimide e.g. Kapton®, styrene, polyvinyl chloride (PVC), or polycarbonate.

Preferably, the sheet has a thickness of between 0.1 mm and 0.5 mm. More preferably, the sheet has a thickness of between 0.2 mm and 0.4 mm. In one example, the sheet has a thickness of 0.225 mm. In a most preferred example, the sheet has a thickness of 0.35 mm. By providing a thickness of less than around 0.5 mm, preferably around 0.35 mm, the valve head is light enough that the time to open the valve is short, improving the efficiency.

Preferably, the valve lever arm has the same thickness as the remainder of the sheet. In other words, the thickness of the sheet is uniform. The valve head and the valve lever arm can have the same thickness. This makes it easier to manufacture because it is not necessary to reduce the thickness of the sheet in any region.

Preferably, the plurality of valves are defined by a plurality of cut-outs in the sheet. The cut-out sections leave material which form the valve lever arm and the valve head. The cut-outs forms gaps in the sheet, which also permit airflow through the valve.

Preferably, the valve head is connected to the sheet by the valve lever arm. For example, the valve head may be connected to the sheet only by the valve lever arm. Otherwise, the valve head is free from the sheet. This allows the valve head to move to and from the vacuum aperture.

In some examples, when the valve is open, the valve head is arranged in the plane of the sheet, for example being in line with the rest of the sheet. In other words, the valve head is preferably not pre-bent into a different plane in the open configuration. This improves ease of manufacture because the valve head does not require pre-bending into another position. Instead, the flat sheet can simply be provided, and the valve head can simply be provided by cutting out a section of the sheet, for example.

Preferably, the valve lever arm is configured to permit the valve head to move out of the plane of the sheet. This allows the valve head to move towards the vacuum aperture to close the valve. To achieve this, the valve lever arm is bendable so that the valve lever arm can bend as the valve head is pulled down towards the vacuum aperture. As the sheet is resilient, the valve lever arm can be configured to return the valve head to the plane of the sheet when the force closing the valve is removed. In other words, tension due to the bending of the valve lever arm pulls the valve head and returns it to the equilibrium position in the plane of the sheet, thus opening the valve. Thus, the valve may be auto-resetting. This is particularly preferable for conveyor printers, where it is not convenient to require a separate opening mechanism, and this does not require shutting off the vacuum.

Preferably, the valve lever arm is configured to cause the valve head to remain parallel to the plane of the sheet when the valve head is arranged out of the plane of the sheet. This is achieved by the particular shape of the valve lever arm. For example, this can be provided by using a valve lever arm which is curved around the side of the valve head. In other examples, this can be provided by a valve lever arm which is straight and has a length greater than the width of the valve head.

In some examples, the valve head may be arranged parallel to the plane of the sheet when the valve is closed. In other words, when the valve head covers the vacuum aperture to close the valve, the valve head may be arranged parallel to the plane of the sheet. In some examples, the valve head may be arranged parallel to a plane defined by an upper surface of the substrate support unit when the valve is closed. The plane of the sheet may be parallel to the plane defined by the upper surface of the substrate support unit. Thus, the valve head may be arranged parallel to the plane of the sheet and parallel to the upper surface of the substrate support unit. This allows the valve head to lie flat against the vacuum aperture to provide an improved seal. The valve head may be arranged parallel to a plane of the vacuum aperture, for example when the valve head closes the valve. In other words, the valve head may lie flat (e.g. horizontal) on the substrate support unit to close the valve. This is in contrast to the valve head lying at an angle, where the substrate support unit is also at an angle. For instance, the substrate support unit may comprise a recess (e.g. cut into the substrate support unit) in which the vacuum aperture is arranged, and the valve head may be arranged to contact a base of the recess to seal the vacuum aperture to close the valve. In some cases, the base of the recess may be parallel to an upper surface of the substrate support unit (e.g. horizontal).

Preferably, the valve lever arm has a length equal to or greater than a width of the valve head. This enables the valve head to move generally parallel to the plane of the sheet so that the valve head can lie flat against the vacuum aperture. The valve lever arm may have a length which is longer than the width of the valve head, preferably at least twice as long, more preferably at least three times as long, even more preferably at least four times as long. Most preferably, the valve lever arm has a length between two and five times the width of the valve head, to provide desired flexibility for ensuring the valve head can lie flat against the vacuum aperture, whilst improving compactness and density of valves.

Preferably, the valve lever arm is configured to permit the valve head to lie flat against the vacuum aperture to seal the vacuum aperture. This allows for a more effective seal. For example, the valve lever arm may permit the valve head to close the vacuum aperture by arranging the valve head parallel to a plane of the vacuum aperture and in contact with the vacuum aperture.

Preferably, the valve lever arm extends from the sheet at a first side of the valve head around the side of the valve head and is connected to the valve head at a second side opposite the first side. This shape permits the valve head to lie flat against the vacuum aperture by being arranged in a plane parallel to the sheet, while also providing a compact arrangement because the valve lever arm is arranged in a small space surrounding the valve head. This allows the packing density to be increased relative to straight valve lever arms.

Preferably, the valve lever arm is curved around the side of the valve head between the first side and the second side. For example, the valve head may be circular. This further improves the compactness by following the curve of the circular valve head. In other examples, the valve lever arm may extend around the valve head in a U-shape.

Preferably, the plurality of valves comprises between 2000 and 3000 valves per m2 of the sheet. This enables a large density of vacuum apertures to be controlled. Clearly, providing this density of ball valves would be complex and expensive, so using a simple sheet provides a much more useful solution.

Preferably, each valve comprises a bypass for equalising pressure. This aids the opening of the valve when the substrate no longer covers the opening. This allows the valve to be auto-resetting. This means that a separate mechanism is not required to open the valve. Instead, the valve automatically opens in response to the substrate no longer covering the opening. This simplifies construction and operation.

Preferably, the substrate support system further comprises a second sheet comprising a plurality of recesses formed into the second sheet, wherein each recess is configured to align with a vacuum aperture when arranged over the substrate support unit, and wherein each recess is configured to receive a valve of the first sheet when the first sheet is arranged over the second sheet.

Preferably, the recesses of the second sheet provide a space to permit movement of the valve head towards the vacuum aperture for closing the valve.

Disclosed herein is a method for using the substrate support system as disclosed herein, the method comprising: providing the substrate support system as disclosed herein; placing a substrate on the conveyor belt; applying, by the source of negative pressure, a negative pressure to the plurality of vacuum apertures to retain the substrate on the conveyor belt; and applying, by the source of positive pressure, a positive pressure to the at least one air bearing to support the conveyor belt. The negative pressure can therefore act to retain the substrate on the conveyor belt, while the positive pressure can support the conveyor belt on the at least one air bearing.

According to a second aspect of the present disclosure, there is provided a method for using a substrate support system for a conveyor printer, comprising: providing a support unit comprising: a plurality of vacuum apertures arranged for fluidic communication with a source of negative pressure; and at least one air bearing arranged for fluidic communication with a source of positive pressure, wherein the air bearing comprises porous media; and a conveyor belt arranged over the support unit for supporting a substrate to be printed on, the conveyor belt comprising a plurality of belt apertures; wherein the vacuum apertures are arranged to convey a negative pressure through the belt apertures for retaining the substrate on the conveyor belt; and wherein the at least one air bearing is arranged to convey a positive pressure to support the conveyor belt; placing a substrate on the conveyor belt; applying, by the source of negative pressure, a negative pressure to the plurality of vacuum apertures to retain the substrate on the conveyor belt; and applying, by the source of positive pressure, a positive pressure to the at least one air bearing to support the conveyor belt. The negative pressure can therefore act to retain the substrate on the conveyor belt, while the positive pressure can support the conveyor belt on the at least one air bearing.

Features of one aspect can be readily applied to the other aspect and vice versa. Apparatus features of the substrate support system can be applied to the method.

Disclosed herein is a support unit for a conveyor printer, comprising: a plurality of vacuum apertures arranged for fluidic communication with a source of negative pressure; and at least one air bearing arranged for fluidic communication with a source of positive pressure, wherein the air bearing comprises porous media; wherein the support unit is configured to receive a conveyor belt in use for supporting a substrate to be printed on; wherein the vacuum apertures are arranged to convey a negative pressure in use through belt apertures of the conveyor belt for retaining the substrate on the conveyor belt; and wherein the at least one air bearing is arranged to convey a positive pressure in use to support the conveyor belt. In this way, it will be appreciated that the support unit can be used together with a conveyor belt, a source of negative pressure, and a source of positive pressure to form a substrate system such as in the first aspect. Features of the first aspect may be applied to this disclosure.

Disclosed herein is a substrate support system for a printer, comprising: a support unit comprising: a plurality of vacuum apertures arranged for fluidic communication with a source of negative pressure; at least one air bearing arranged for fluidic communication with a source of positive pressure, wherein the air bearing comprises porous media; and a substrate support surface for supporting a substrate to be printed on; wherein the vacuum apertures are arranged to convey a negative pressure through the substrate support surface for retaining the substrate on the substrate support surface; and wherein the at least one air bearing is arranged to convey a positive pressure for releasing the substrate from the substrate support surface. In this way, the substrate support system may be used for a printer such as a flat-bed printer. The air bearings may be used for aiding release of the substrate, such as after a printing operation has been completed or for otherwise moving the substrate. Features of the first aspect may be applied to this disclosure.

Disclosed herein is a substrate support system for a conveyor printer, comprising: a support unit comprising: a plurality of vacuum apertures arranged for fluidic communication with a source of negative pressure; and at least one air bearing arranged for fluidic communication with a source of positive pressure; and a conveyor belt arranged over the support unit for supporting a substrate to be printed on, the conveyor belt comprising a plurality of belt apertures; wherein the vacuum apertures are arranged to convey a negative pressure through the belt apertures for retaining the substrate on the conveyor belt; and wherein the at least one air bearing is arranged to convey a positive pressure to support the conveyor belt. In this way, the at least one air bearing need not be a porous media air bearing. For example, the air bearing may be an aperture air bearing. In one example, the air bearing may be an aerostatic air bearing. For example, the air bearing may be a micro-nozzle air bearing, an orifice type air bearing, or an air caster air bearing. In another example, the air bearing may be an aerodynamic air bearing. Features of the first aspect may be applied to this disclosure.

Embodiments of the disclosure are described below, by way of example only, with reference to the accompanying Figures.

Figure 1:
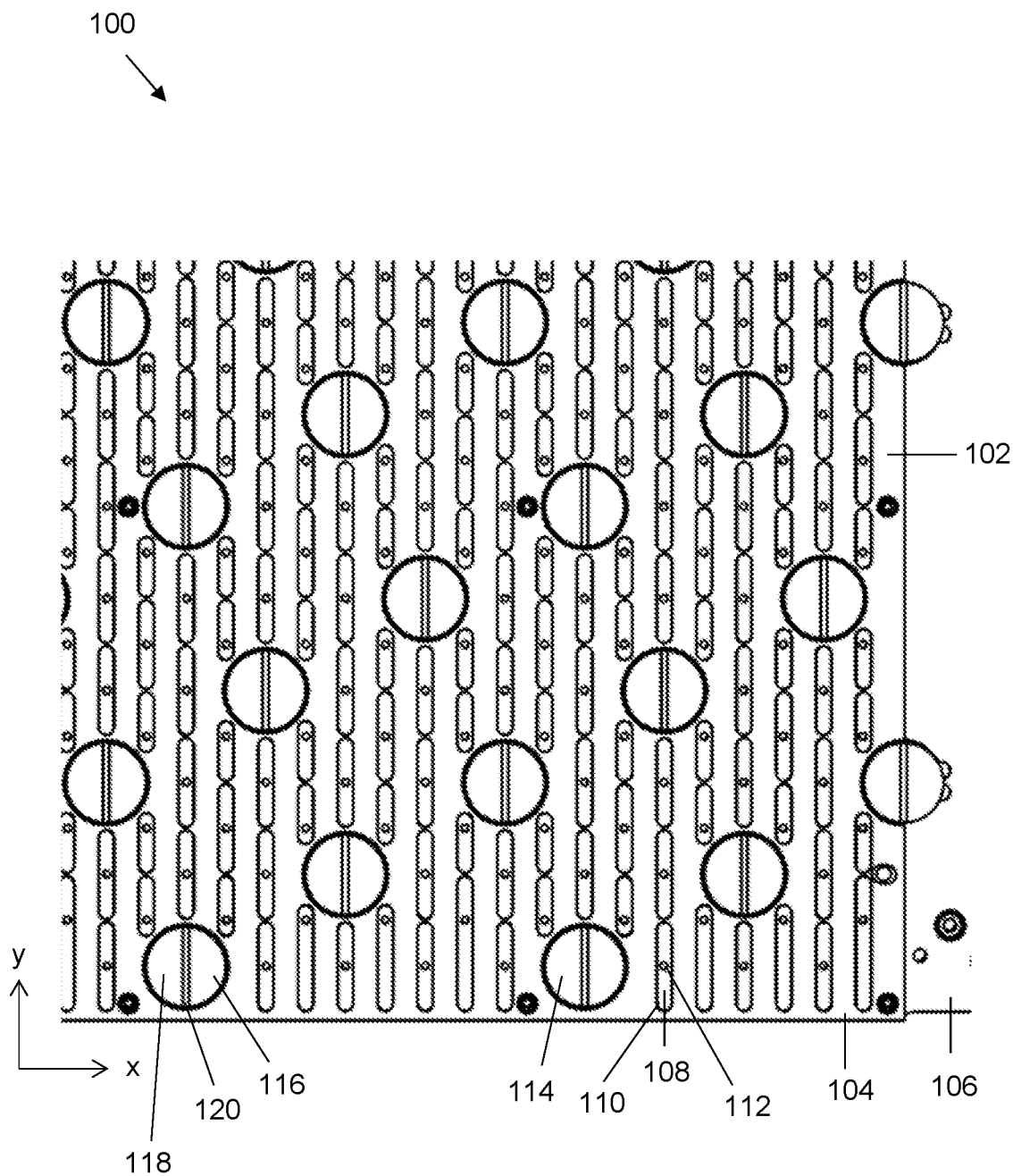
FIG. 1 shows a plan view from above of a portion of a support unit for a substrate support system according to a first embodiment of the present disclosure.
Figure 2:
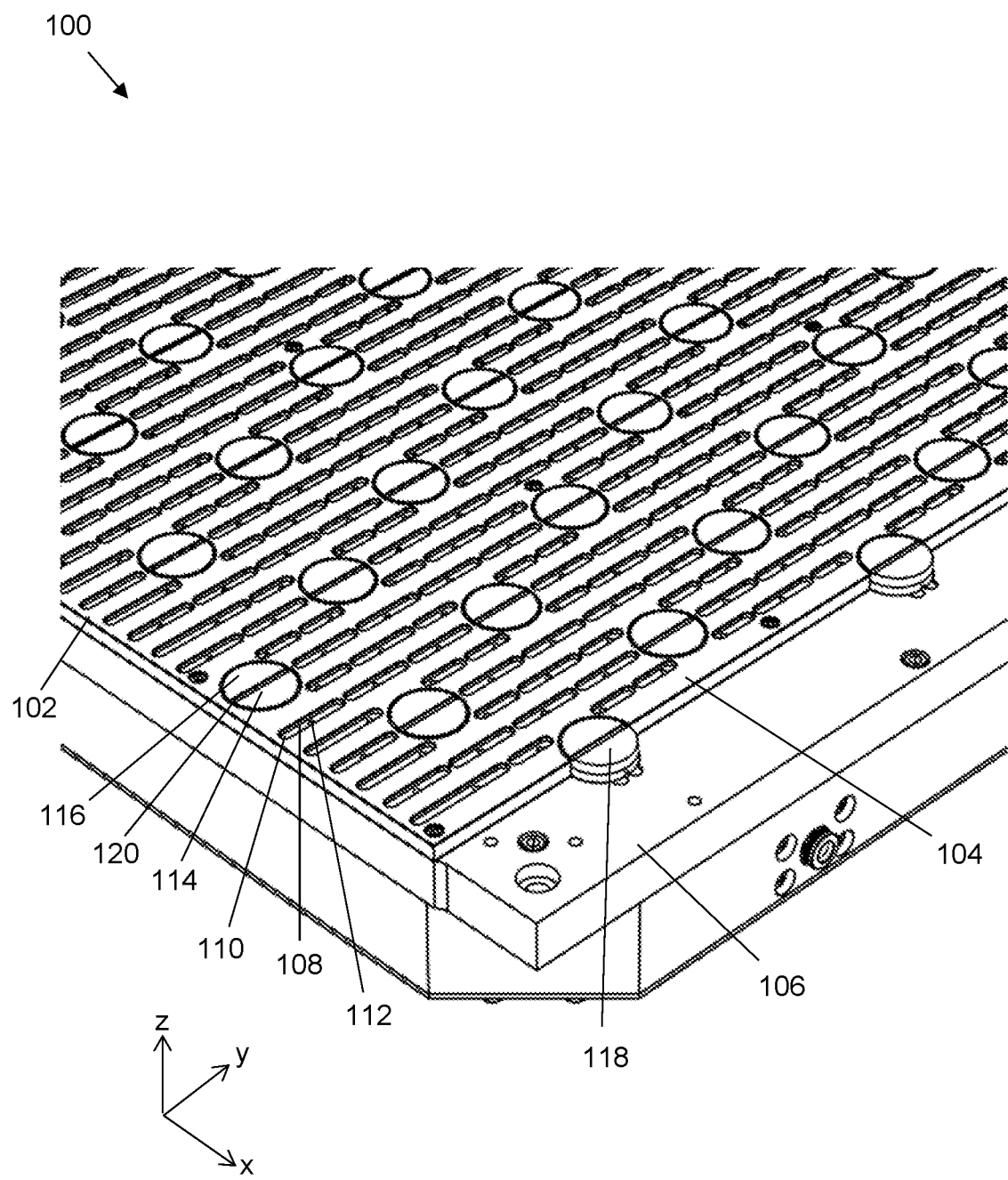
FIG. 2 shows a perspective view of the support unit of FIG. 1.

Referring to FIGS. 1 and 2, a substrate support unit 100 for a substrate support system according to a first embodiment of the present disclosure is provided. The substrate support unit 100 may otherwise be referred to as a support unit 100. The support unit 100 is for a conveyor printer. A conveyor printer is a printer which uses a conveyor belt to provide the printing motion. In particular, the conveyor belt is provided to feed a substrate towards a printhead for printing, and printing can be performed by the conveyor belt moving the substrate under the printhead. The substrate support system comprises the support unit 100 and further comprises a conveyor belt (not shown in FIGS. 1 and 2).

In use, the conveyor belt is supported on the support unit 100. In particular, the support unit 100 comprises an upper surface 102. The conveyor belt is then arranged over the upper surface 102 so that the conveyor belt can move over the upper surface 102 to feed a substrate through a printer for printing. More precisely, as will be described below, the conveyor belt is supported at a position slightly above the upper surface 102, by virtue of air bearings, rather than directly on the upper surface 102 itself.

The upper surface 102 is arranged in a plane which extends in the x direction and the y direction. The x direction is indicated by arrows in FIGS. 1 and 2, and the y direction is indicated by arrows in FIGS. 1 to 3. The y direction is the direction of movement of the conveyor belt, and hence the feed direction of the substrate. In other words, the y direction is parallel to the length of the conveyor belt. The x direction is perpendicular to the y direction. The x direction is perpendicular to the direction of movement of the conveyor belt, and hence is perpendicular to the feed direction of the substrate. In other words, the x direction is parallel to the width of the conveyor belt. The z direction is perpendicular to the x and y directions, and is arranged out of the page in FIG. 1. The z direction corresponds to a height, for example above the upper surface 102. The z direction is indicated by arrows in FIGS. 2 and 3. In the first embodiment, in use, the x and y directions are horizontal, and the z direction is vertical.

As shown in FIG. 2, the upper surface 102 is at least partially defined by an upper surface of a plate 104. In the first embodiment, the support unit 100 comprises the plate 104. The plate 104 is attached to an upper surface of a mount 106. The plate 104 extends in the x-y plane and has a thickness in the z direction. In other examples, the upper surface 102 may be defined by a plate 104 integral with the mount 106.

The support unit 100 comprises a plurality of vacuum apertures 108. In particular, the vacuum apertures 108 are arranged through the upper surface 102. The vacuum apertures 108 are spaces in the upper surface 102 which provide communication with a negative pressure. The vacuum apertures 108 are arranged through the thickness of the plate 104. In this way, the vacuum apertures 108 provide fluid communication between the upper surface 102 at the upper surface of the plate 104 and the underside of the plate 104. This allows the vacuum apertures 108 to provide a connection between a negative pressure applied from below the upper surface 102 (i.e. from below the plate 104) to the upper surface 102 (i.e. to above the plate 104). To provide this, the vacuum apertures 108 are connected to a source of negative pressure.

In the first embodiment, the vacuum apertures 108 comprise a plurality of slots 110 in the plate 104. Each vacuum aperture 108 is in the form of a slot 110. In other words, the plate 104 comprises a plurality of slots 110. The slots 110 form the vacuum apertures 108 in the upper surface 102. The slots 110 are distributed over the upper surface 102 in the upper surface of the plate 104. These slots 110 have an elongate shape which is longer in the y direction than the x direction. The slots 110 are formed from parallel sides along the length with rounded ends. The slots 110 have a shape which may be referred to as a stadium shape or a rounded rectangle. The slots 110 extend in the y direction so that a length of the slots 110 is in the y direction, and a width of the slots 110 is in the x direction. The slots 110 have a depth into the thickness of the plate 14 in the z direction. In the first embodiment, the slots 110 extend a depth less than the thickness of the plate 104. Each slot 110 therefore forms a recess in the plate 104. At the bottom of the recess, the vacuum aperture 108 comprises a hole through the remaining thickness of the plate 104, wherein the hole is connected to the slot 110. In other embodiments, the slot 110 extends through the entire thickness of the plate 104 so that the slot 110 is in the form of a through-hole through the plate 104. Each slot 110 corresponds to a respective vacuum aperture 108. Each slot 110 thus functions as a vacuum aperture 108 providing fluid communication through the plate 104.

The support unit 100 also comprises a plurality of vacuum openings 112. The vacuum openings 112 are arranged in the upper surface of the mount 106. The vacuum openings 112 thus lie in the x-y plane which aligns with the lower surface of the plate 104. The vacuum openings 112 are thus arranged in a plane which is parallel to the upper surface 102. The vacuum openings 112 correspond to the slots 110. In particular, each vacuum opening 112 is aligned with a respective slot 110 in the plate 104. Thus, the vacuum openings 112 are arranged in the z direction at the base of each slot 110. In the first embodiment, the vacuum openings 112 in the mount 106 are aligned and in fluid communication with the holes at the bottom of the slots 110. In other embodiments where the slots 110 extend through the entire thickness of the plate 104, the vacuum openings 112 are instead aligned generally with and are in fluid communication directly with the slots 110. The vacuum openings 112 are arranged in the centre of the slots 110 in the x direction. Each vacuum opening 112 is connected through the mount 106 to the source of negative pressure. Therefore, the vacuum aperture 108 provides fluid communication between the upper surface 102 and the source of negative pressure through the slots 110, and in turn through the vacuum openings 112. In this way, the vacuum opening 112 at the base of the slot 110 can apply the negative pressure through the slot 110 to the upper surface 102. In other words, the slot 110 becomes the effective vacuum aperture 108 arranged at the upper surface 102. The uppermost point of the slots 110 at the upper surface of the plate 104 define the uppermost point of the vacuum apertures 108 at the upper surface 102. In other words, the upper surface 102 comprises the upper surface of the plate 104 with a plurality of vacuum apertures 108 in the form of slots 110 in the plate 104. Each vacuum opening 112 corresponds with a respective vacuum aperture 108.

The function of the vacuum apertures 108 is to hold down a substrate which is placed onto the conveyor belt which runs over the upper surface 102. In particular, the vacuum apertures 108 are connected to a source of negative pressure so that the vacuum apertures 108 are arranged to convey a negative pressure to the substrate arranged on the upper surface 102. In the first embodiment, the source of negative pressure is a vacuum pump. The vacuum pump is connected to the vacuum apertures 108 underneath the upper surface 102 through conduits arranged through the mount 106, through the vacuum openings 112, and to the slots 110. The slots 110 convey the negative pressure to the upper surface 102 above which the conveyor belt is supported by the air bearings. To convey the negative pressure from the vacuum apertures 108 to the substrate, the conveyor belt is perforated to permit fluid communication between the vacuum apertures 108 and the substrate. To achieve this the conveyor belt has belt apertures which are arranged in rows which generally align with the rows of slots 110 so that the vacuum apertures 108 can convey the negative pressure through the conveyor belt and to the substrate. By applying a negative pressure to the substrate, a suction force is applied to the substrate towards the upper surface 102 by virtue of the vacuum apertures 108. This acts to hold the substrate down on the conveyor belt. This keeps the substrate retained in place during movement of the conveyor belt and during the printing process. This improves alignment and thus printing quality.

In the first embodiment, the vacuum apertures 108 are arranged in an array over the upper surface 102. The vacuum apertures 108 are arranged in rows which each extend in the y direction. In particular, the slots 110 are arranged in rows each extending in they direction. Each adjacent slot 110 in they direction is adjacent but separated so that each slot 110 is isolated from each other. This permits the vacuum pressure to be more precise, as certain vacuum apertures 108 may be opened or closed in order to turn on or off the vacuum in each particular location. This can be used for precise control over retaining the substrate, for example at the edge of the substrate.

The vacuum openings 112 are also arranged in an array. In the first embodiment, the vacuum openings 112 are arranged in rows extending in they direction. Precisely, each row of vacuum openings 112 extends in the y direction. The vacuum openings 112 align with the slots 110, so thus correspond to the arrangement of the rows of the slots 110. In the first embodiment, each alternate row of vacuum openings 112 in the x direction is offset in the y direction with a repeating period of two. In other words, each adjacent vacuum opening 112 in the x direction is not aligned at the same y position. The offset amount is equal to the pitch between adjacent rows, so that the vacuum openings 112 form a square array parallel to the upper surface 102. Thus, every two rows in the x direction are aligned in position in the y direction. As such, the vacuum openings 112 are diagonally aligned in rows extending in the x=y direction i.e. the diagonal between the x and y directions. The skilled person will appreciate that other arrangements of vacuum openings 112 may be provided in other embodiments.

In the first embodiment, the vacuum apertures 108 have a pitch of 13 mm. The pitch is the distance between rows of adjacent vacuum apertures 108 in the x direction. In other words, the pitch is the separation between the centre line of a first row of slots 110 which extends in the y direction and the centre line of a second row of slots 110 immediately adjacent to the first row of slots in the x direction. In other examples, the pitch may be longer or shorter, and in one example is between 10 mm and 15 mm. The value is chosen to correspond to the pitch between belt apertures in the conveyor belt so that the apertures can align for application of the pressure to the substrate. In the first embodiment, the belt apertures of the conveyor belt also have a pitch of 13 mm. A smaller pitch improves hold down closer to the substrate edges, but requires smaller structure and more structures per m2 of the belt, which is more difficult and expensive to manufacture. In some examples, the belt may comprise a structure on the upper surface of the belt to distribute vacuum.

In the first embodiment, the separation in the y direction between adjacent vacuum openings 112 in the same row along the y direction (i.e. at the same position in the x direction) is twice the pitch in the x direction. In other embodiments, this separation may be different, and may be different from the pitch, resulting in an array which is not square.

In the first embodiment, the width of the slots 110 is 5 mm. The width is the extent of the slot 110 in the x direction. More precisely, the width is the distance in the x direction between opposing edges of the same slot 110. The width is the widest point in cases where the width is not constant. The width is perpendicular to the length of the slot 110 which extends in the y direction. In other examples, the width of the slots 110 has other values such as between 3 mm and 10 mm. In some embodiments, the width of the slot 110 corresponds to the width of the belt apertures. In other examples, the width of the slot 110 is slightly larger to give some tolerance in belt tracking.

The land between adjacent slots 110 in the x direction is 8 mm. The land is the distance between the closest edges of adjacent slots 110 in the x direction. In other examples, the land has other values. In one example, the land may be between 4 mm and 12 mm. The size of the land may be chosen to provide sufficient space for air bearings and to avoid reducing the positive pressure around the edges of the air bearing.

The length of the slots 110 is between 15 and 40 mm. The length is the extent of the slot 110 in the y direction. More precisely, the length is the distance in the y direction between opposing edges of the same slot 110. The length is the longest point in cases where the length is not constant. In the first embodiment, the length is measured as the largest separation in the y direction between either (furthermost) end of the slot 110. The length of the slots 110 is chosen to be not too long because then they will be vented by the edge of the substrate, and will not provide good hold down. The length of different slots 110 is varied to accommodate the air bearings mentioned below. As such, in some cases the vacuum opening 112 is not aligned in the centre of the slot 110 in they direction for slots 110 which have a short length to accommodate an air bearing. In other examples, the length of the slots 110 has other values.

The bridge between adjacent slots 110 in they direction is as short as possible. The bridge is the distance between the closest edges of adjacent slots 110 in the y direction. It is beneficial for the bridges to be short because they interrupt vacuum supply to the substrate.

The upper surface 102 comprises at least 2000 vacuum apertures 108 per m2 of the upper surface 102. It is noted that FIGS. 1 to 2 only show a portion of the upper surface 102 for illustrative purposes. As such, the plate 104 comprises at least 2000 slots per m2 of the upper surface of the plate 104, and the mount 106 comprises at least 2000 vacuum openings 112 per m2 of the upper surface of the mount 106. In the first embodiment, the number of slots is 2155 per m2, but this may be varied in other embodiments.

In the first embodiment, the source of negative pressure is configured to apply a negative pressure of between −100 mbarg to −250 mbarg to the vacuum apertures 108. For the avoidance of doubt, the unit mbarg refers to millibars of gauge pressure above atmospheric pressure, sometimes also represented as mbar(g). Therefore, the negative pressures above refer to a gauge pressure below atmospheric pressure (i.e. a vacuum pressure). In SI units, this provides a negative pressure of −10 kPa to −25 kPa relative to atmospheric pressure (being approximately 101 kPa).

The support unit 100 also comprises at least one air bearing 114. The air bearing 114 provides fluid communication with a positive pressure. In the first embodiment, the support unit 100 comprises a plurality of air bearings 114. These air bearings 114 are individual air bearings 114 which are arranged in an array over the upper surface 102. In particular, the air bearings 114 are distributed throughout the plate 104. The air bearings 114 are arranged through the thickness of the plate 104. The plate 104 comprises holes for receiving the air bearings 114 and the air bearings 114 are arranged through holes in the plate 104. As will be described in more detail below, the air bearings 114 have an upper surface 118 which is arranged to protrude above the plane of the upper surface 102. In the first embodiment, the upper surface 118 is arranged at a height of 150 µm above the upper surface 102 of the support unit 100. The air bearings 114 extend through the entire thickness of the plate 104 so that the air bearings 114 can be connected to a source of positive pressure below the plate 104.

In this way, the air bearings 114 provide fluid communication between the upper surface 102 at the upper surface of the plate 104 and the underside of the plate 104. This allows the air bearings 114 to provide a connection between a positive pressure applied from below the upper surface 102 (i.e. from below the plate 104) to the underside of the conveyor belt above the upper surface 102 (i.e. to above the plate 104).

The air bearings 114 are porous media air bearings 114 and comprise a porous media 116. The porous media 116 is arranged at the upper part of the air bearing 114 in the z direction. The upper surface 118 of the porous media 116 is arranged to protrude above the plane of the upper surface 102. The air bearings 114 deliver a positive pressure to the underside of the conveyor belt. As will be described in more detail with reference to FIGS. 4A and 4B, the air bearing 114 is structured so that the air bearing 114 can convey an airflow to the conveyor belt. The air bearing 114 is in fluid communication with a source of positive pressure. The air applied by the source of positive pressure can diffuse through the porous media 116 to the upper surface 118 of the air bearing 114 to be released above the upper surface 102 for supporting the conveyor belt.

The function of the air bearings 114 is to support the conveyor belt which is placed onto the upper surface 102. The air bearings 114 provide a cushion of air on which the conveyor belt rests. In particular, the air bearings 114 are connected to a source of positive pressure so that the air bearings 114 are arranged to supply a positive pressure to the conveyor belt arranged on the upper surface 102. In the first embodiment, the source of positive pressure is an air pump. The air pump is connected to the air bearings 114 underneath the upper surface 102 through conduits arranged through the mount 106. A flow of air is then provided to the air bearings 114 which is delivered to the upper surface 102 by diffusing through the porous media 116 to the upper surface 118 of the air bearing 114. This positive pressure released at the upper surface 118 of the air bearing 114 forms a thin film of air over the upper surface 118 of the air bearing 114. For example, this film of air may have a thickness of around 3 to 10 μm. The conveyor belt then rests on the cushion of air, suspending the conveyor belt away from (above) the upper surface 102. As such, the conveyor belt does not rest in physical contact with elements of the upper surface 102 (i.e. it does not rest on the upper surface of the plate 104). This reduces friction between the conveyor belt and the upper surface 102 because they are not in direct physical contact and the conveyor belt does not move over the upper surface 102 while being in contact. This prevents sticking of the conveyor belt on the upper surface 102 and enables smooth movement. Furthermore, heat dissipation due to high friction can be avoided, and the efficiency can be improved while avoiding damage to the conveyor belt via wear due to contact with the upper surface 102.

Therefore, the support unit 100 provides an arrangement which permits a conveyor belt to be supported on an array of air bearings 114 to reduce friction, while permitting the substrate to be appropriately held down to the conveyor belt by the vacuum apertures 108.

It will be appreciated that this describes an idealised embodiment of the system. In a practical implementation, the conveyor belt may touch areas of the support unit 100 due, for example to the belt or the upper surface of the plate 104 being slightly uneven.

The porous media 116 of the air bearings 114 is advantageous compared to traditional aperture-based air bearings because this requires a much lower air consumption to generate the required air cushion for supporting the conveyor belt. In contrast, aperture air bearings require a high consumption of air which is costly and complex to implement, and well as increasing noise of operation. The porous media 116 of the air bearings 114 is also much more stable. The leak path is also improved and the bleed at the edges is lower, so the balance of the positive and negative pressures is easier to manage. This is particularly important given the close proximity of the air bearings 114 and the vacuum apertures 108.

The air bearings 114 are arranged interspersed between the vacuum apertures 108. In the first embodiment, there are more vacuum apertures 108 than air bearings 114. In particular, on average, there are around 10 vacuum apertures 108 for each air bearing 114, and in one example there are on average 8.25 vacuum aperture 108 for each air bearing 114.

In the first embodiment, the porous media 116 comprises carbon. Specifically, the carbon is in the form of sintered carbon. This carbon is porous so that when the positive air pressure is applied to the air bearing 114, the air permeates through the carbon porous media 116 to the upper surface 118 to be released above the upper surface 102 to form the cushion of air. In some cases, the porosity of the porous media 116 can be controlled over a wide range during manufacture by varying the pressure during sintering, grain size of the powder before sintering, and then impregnating with resin and sintering again to reduce porosity.

In the first embodiment, the porous media 116 has a thickness of 4 mm. The thickness is selected to withstand the pressures, which in the first embodiment is around 6 bar pressure on most of the underside, and to avoid significant distortion. The thickness is also chosen to ensure the positive air can diffuse to be reasonably uniform by the time the air reaches the upper surface 118. In other words, this avoids regions of significantly less airflow, such as above the attachment surface to the carrier described below.

In the first embodiment, the air bearings 114 are generally circular. More precisely, the upper surface 118 of each air bearing 114 exposed above the upper surface 102 is of a generally circular shape.

In the arrangement of the first embodiment, the air bearings 114 have a diameter larger than the pitch between the vacuum apertures 108. The diameter of the air bearings 114 is also larger than the width of the slots 110. In fact, in the first embodiment the air bearings 114 have a diameter approximately equal to twice the pitch between the vacuum apertures 108 in the x direction. Thus, the air bearings 114 have a diameter of 26 mm. This means that the air bearings 114 cannot be arranged in between adjacent rows of vacuum apertures 108 because there is not enough space between the slots 110. To accommodate this, the air bearings 114 are placed in regions on the upper surface 102 where the vacuum apertures 108 are not arranged. In other words, gaps are formed in the array of the vacuum apertures 108 and vacuum apertures 108 are removed from the array so that the air bearing 114 can fit into the array. In other words, the rows of vacuum apertures 108 in the y direction are interrupted to fit the air bearings 114. In the first embodiment, due to the offset pattern of the vacuum apertures 108 and the size of the air bearings 114, on average only one vacuum aperture 108 is removed from the array for the positioning of each air bearing 114. The lengths of the slots 110 immediately around the air bearing 114 are shortened in order to accommodate the size of the air bearing 114.

In other examples, smaller air bearings 114 may be provided which can fit between adjacent slots 110. To achieve this, the air bearings 114 have a diameter smaller than the land between adjacent slots 110. This makes the air bearings 114 smaller, which means a larger number are required to generate the supporting force for the conveyor belt, leading to higher costs. As such, the first embodiment provides a particular optimum embodiment which balances costs and supporting force.

In the first embodiment, the air bearings 114 are arranged to align with some of the rows of vacuum apertures 108. In particular, the centre line of each air bearing 114 in the y direction is aligned with a row of vacuum apertures 108 in the y direction. In this arrangement, because the air bearing 114 has a diameter larger than a width of the slot 110, the air bearing 114 extends over the land between adjacent rows of vacuum apertures 108. This means that a positive pressure is provided to the area of the air bearing 114 and thus to a point above this portion of the upper surface 102 including the land between adjacent rows of vacuum apertures 108 at which the air bearing 114 is located. Thus, the air bearing 114 forms a positive pressure region amongst the vacuum apertures 108. The air bearings 114 are arranged in an array with rows in the x direction where each adjacent row in the y direction is offset with a repeating period of five. In other words, every five rows in the y direction are aligned in position in the x direction. The air bearings 114 are diagonally aligned at an angle. The skilled person will appreciate that, in other embodiments, different arrangements are possible. For example, the array of air bearings 114 may be a square array, or may have an offset with a different repeating period.

Each row of air bearings 114 in the x direction is separated from an adjacent row in the y direction by an amount from the centre of each row along the x direction equal to the diameter of the air bearings 114. In other words, the pitch of the air bearings 114 in the y direction is equal to the diameter. In the first embodiment, the pitch of the air bearings 114 in the y direction is 26 mm. The edges of air bearings 114 of one row are thus aligned with the edges of air bearings 114 of an adjacent row. However, as the air bearings 114 of adjacent rows are offset in the x direction, air bearings 114 in adjacent rows do not touch. The air bearings 114 are arranged in columns in the y direction. Each column is separated from an adjacent column in the x direction by an amount from the centre of each column along the y direction equal to the diameter of the air bearings 114. In other words, the pitch of the air bearings 114 in the x direction is equal to the diameter. In the first embodiment, the pitch of the air bearings 114 in the x direction is 26 mm. The edges of air bearings 114 of one column are thus aligned with the edges of air bearings 114 of an adjacent column. However, as the air bearings 114 of adjacent columns are offset in the y direction, air bearings 114 in adjacent columns do not touch.

Other arrangements of individual air bearings 114 and vacuum apertures 108 may be provided, and the arrangement may vary, for example, based on the thickness of the belt, the size of the air bearings 114 and the pressure of the positive pressure source.

In the first embodiment, the source of positive pressure is configured to apply a positive pressure of between 0.4 MPa to 0.6 MPa to the air bearings 114. In one embodiment, the vacuum pressure can be around −100 mbarg, and the positive pressure can be around 0.6 MPa, but the volume flow in the vacuum regions is much higher than the volume flow in the positive pressure region because the positive pressure air film is so thin. In one embodiment, with 0.4 MPa applied to the air bearings 114 having a diameter of 26 mm and a thickness of 4 mm, an airflow of around 1 litre per minute (lpm) can be achieved.

In the first embodiment, each air bearing 114 also comprises a slit 120. The slit 120 is arranged in the upper surface 118 of the porous media 116. The slit 120 extends across a width of the air bearing 114 at the centre in the y direction. In other words, the slit 120 extends across a diameter of the porous media 116 of the air bearing 114. The slit 120 is thus aligned with the respective row of vacuum apertures 108. The slit 120 is a recess in the porous media 116 of the air bearing 114 so that the porous media 116 in the region of the slit 120 does not extend up to the upper surface 118, creating a space. In the first embodiment, the slit 120 has a depth less than the height of the porous media 116 in the z direction, meaning the slit 120 does not extend through the full thickness of the porous media 116. In the first embodiment, the slit 120 has a depth of 0.5 mm. The depth of the slit 120 is significantly deeper than the air film thickness (which may, for example, be around 5 μm). The slit 120 forms a region along the centre line which has a lower pressure than the air bearing 114 at either side of the slit 120. This is because the vacuum pressure acts to evacuate the slit 120 and prevent positive pressure building up in this region. In particular, the slit 120 forms a gap at the side of the air bearing 114 away from the upper surface 118, and so due to the height difference between the air bearing 114 and the upper surface 102 of the plate 104, a connection is provided between the slit 120 and the gap between the upper surface 102 of the plate 104 and the underside of the conveyor belt. The gap between the upper surface 102 and the conveyor belt means that the vacuum apertures 108 evacuate this gap and a negative pressure is formed in this region. The slit 120 provides fluid communication between the slit 120 and this negative pressure region between the vacuum apertures 108 and the conveyer belt. The positive pressure generated at the location of the slit 120 is thus much lower than either side of the slit 120. This effectively splits the air bearing 114 into two smaller effective air bearings either side of the slit 120.

In use, a conveyor belt with belt apertures aligned with the rows of vacuum apertures 108 will pass over (and disposed away from) the upper surface 102 in the y direction. The belt apertures are arranged in rows extending in they direction and aligned with the slots 110. Because the centre of the air bearings 114 intersects this row, the belt apertures will pass over the centre line of the air bearings 114. Without the slits 120, the positive pressure from the air bearings 114 would pass through the belt apertures and act on the substrate. This would reduce the effectiveness of the vacuum hold-down force applied by the vacuum apertures 108 and pushing the substrate away from the conveyor belt. By providing the slits 120, the air provided to the central region and thus released between the upper surface 102 and the conveyor belt is evacuated by the vacuum. This avoids a reduction in the effectiveness of the vacuum. In some examples, the slit 120 can be sealed, for example with varnish, to save air consumption. In other examples, the slit 120 is not hollow and may be filled with a non-porous or low porosity material in order to reduce air flow through the central region. In some examples, the slits 120 are not required. For example, in embodiments where the air bearings 114 are smaller than the lands, slits 120 are not required as the air bearing 114 can be located in regions which do not overlap with the rows of slots 110.

Figure 3:
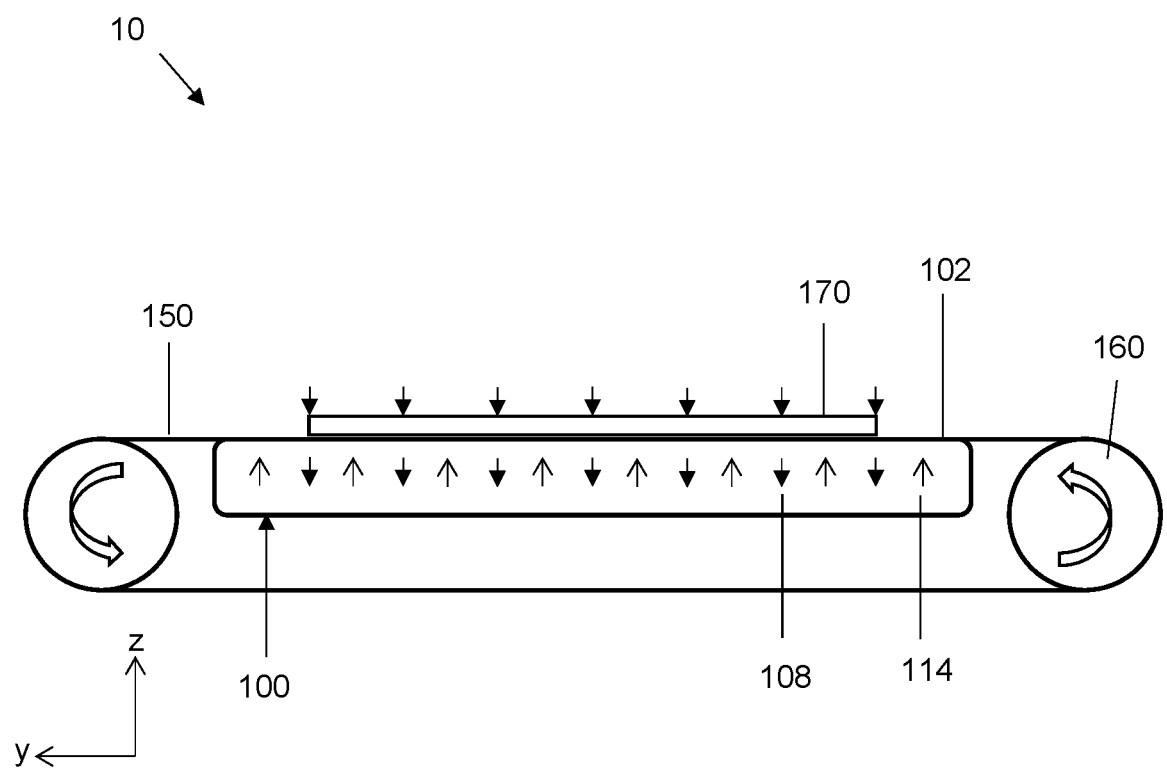
FIG. 3 shows a schematic view from the side of the substrate support system according to the first embodiment of the present disclosure for use in a conveyor printer.

Referring to FIG. 3, a substrate support system 10 according to the first embodiment is provided. The substrate support system 10 comprises a support unit 100. The support unit 100 is the same as the support unit 100 of the first embodiment shown in FIGS. 1 and 2, and is represented schematically.

The support unit 100 comprises an upper surface 102. The upper surface 102 is arranged in the x-y plane, where the x direction is into the page in FIG. 3. The support unit 100 has a plurality of vacuum apertures 108 and a plurality of air bearings 114. As described above, the vacuum apertures 108 are connected to a source of negative pressure and are configured to provide a negative pressure at the upper surface 102. The vacuum apertures 108 are represented by downward facing arrows in the negative z direction to indicate the downward force of the negative pressure. As described above, the air bearings 114 are connected to a source of positive pressure and are configured to provide a positive pressure above the upper surface 102. The air bearings 114 are represented by upward facing arrows in the z direction to indicate the upward force of the positive pressure. It is noted that the number and spacing of the arrows is for illustrative purposes only.

The substrate support system 10 also comprises a conveyor belt 150. The conveyor belt 150 is made from metal, in particular stainless steel. In other examples, the conveyor belt 150 may be made from other materials such as other metals including copper, or made from plastic. In the first embodiment, the conveyor belt has a length of 7.5 m, a width of 0.8 m and a thickness of 0.8 mm, but other dimensions are possible. The conveyor belt 150 can be chosen to be reasonably robust but not require large diameter drums or rollers. The drum diameter can be chosen as the minimum to avoid fatigue problems with the desired belt.

The conveyor belt 150 is supported over the upper surface 102. The conveyor belt 150 is tensioned between two rollers 160 and can use conventional means for moving the conveyor belt 150. In FIG. 3, the rollers 160 are arranged to rotate about the x direction in a counter-clockwise direction as indicated by the arrows. This moves the conveyor belt 150 in a loop in the counter-clockwise direction around the support unit 100, meaning that the conveyor belt 150 moves over the upper surface 102 in the positive y direction.

In use, a substrate 170 is arranged on the conveyor belt 150. The substrate 170 may be any substrate to be printed on, such as paper or card. When the substrate 170 is placed on the conveyor belt 150, the rollers 160 can be rotated to move the conveyor belt 150 which feeds the substrate 170 along the y direction. This can be used to move the substrate 170 to be printed. In this manner, the support unit 100 can be used alongside a printer (not shown). The printer can be a conveyor printer which uses the conveyor belt 150 to move a substrate 170 under an array of printheads to print onto the substrate 170. For example, the conveyor printer may be an inkjet printer arranged on deposit ink onto the substrate 170 as it moves under the printhead.

The conveyor belt 150 comprises belt apertures through the thickness of the conveyor belt 150. The belt apertures are configured to convey the negative pressure from the vacuum apertures 108 in the upper surface 102 to the substrate 170. In the first embodiment, the belt apertures are arranged in rows which extend along the length of the conveyor belt 150. The vacuum apertures 108 are arranged in rows corresponding to the rows of the belt apertures. These belt apertures align with the slots 110 of the plate 104. In this arrangement, when the conveyor belt 150 is arranged over the upper surface 102 such that the belt apertures align with the vacuum apertures 108, the vacuum apertures 108 are arranged to convey the negative pressure from the source of negative pressure through the belt apertures and to the substrate 170 which is arranged above the belt apertures. When a substrate 170 is placed over the belt apertures aligned with the vacuum apertures 108, the substrate 170 can be held in place by the vacuum force. This is indicated by the downward facing arrows in the negative z direction above the substrate 170 due to atmospheric pressure acting on the substrate 170 towards the negative pressure from the vacuum apertures 108. In this way, the substrate 170 is held down onto the conveyor belt 150 and can be securely retained, improving alignment for printing.

The air bearings 114 act on the conveyor belt 150 to provide a cushion of air between the upper surface 118 of the air bearings 114 and the underside of the conveyor belt 150. The air bearings 114 protrude from the upper surface 102 so that the upper surface 118 of the air bearings 114 is arranged above the upper surface 102. The cushion of air provided over the upper surface 118 of the air bearings 114 is arranged slightly above the upper surface 102 so that the conveyor belt 150 is supported slightly above the upper surface of the plate 104. In this way, direct physical contact is avoided between the conveyor belt 150 and the plate 140 or other components of the upper surface 102. Instead, the conveyor belt 150 is supported on the cushion of air provided by the air bearings 114, reducing friction when the conveyor belt 150 is advanced.

Because the air bearings 114 are generally not aligned with the belt apertures (by virtue of the slits 120 preventing an air cushion forming in the region of the slits 120 aligned with the belt apertures), the air bearings 114 generally do not act on the substrate 170 and cause minimal interference with the vacuum hold-down force on the substrate 170 on the conveyor belt 150. Instead, the air bearings 114 support the conveyor belt 150 at a position spaced away from the upper surface 102 so that the conveyor belt 150 can slide over the upper surface 102 with reduced friction.

In this manner, the support unit 100 can be used in a conveyor printer to retain the substrate 170 on the conveyor belt 150 by the vacuum apertures 108 for more precise printing, while the air bearings 114 act to support the conveyor belt 150 and reduce friction.

Figure 4A:
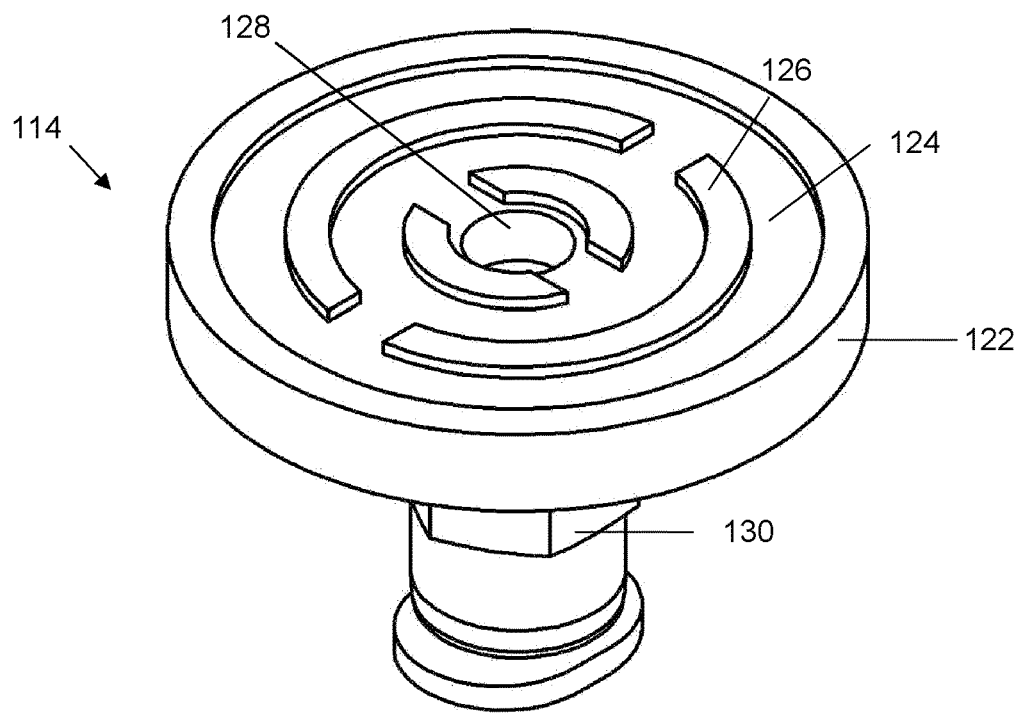
FIG. 4A shows a perspective view of an air bearing for the substrate support system according to the first embodiment of the present disclosure, with the porous media removed.
Figure 4B:
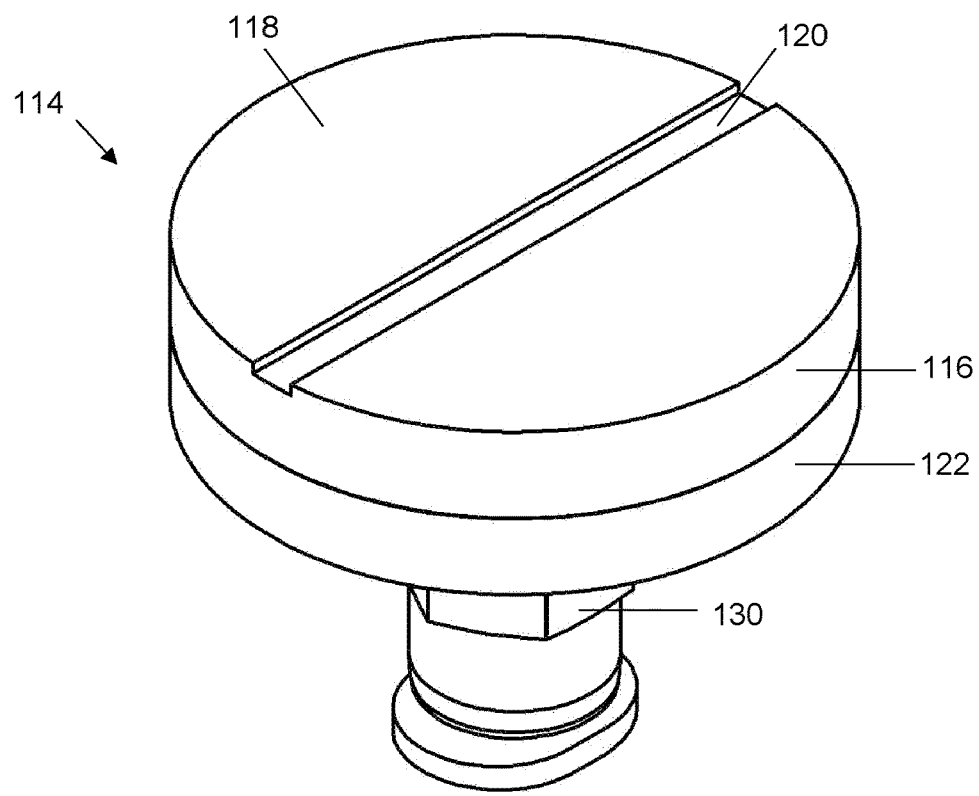
FIG. 4B shows a perspective view of the air bearing of FIG. 4A, with the porous media applied.

Referring to FIGS. 4A and 4B, the structure of the air bearings 114 used in the support unit 100 of the first embodiment are shown in more detail. FIG. 4A shows an air bearing 114 without the porous media 116 attached, in order to show the structure underneath. The air bearing 114 comprises a carrier 122. The carrier 122 is made of metal, but may be made of other materials in other examples. The carrier 122 has a circular shape complementary to the circular shape of the porous media 116. The carrier 122 is shaped to support the porous media 116. The carrier 122 comprises channels 124 for distributing the air over the lower surface of the porous media 116. The carrier 122 also comprises an attachment surface 126 for attaching the porous media 116 to the carrier 122. For example, the porous media 116 may be attached to the carrier 122 by adhesive. The channels 124 are arranged around the attachment surface 126. The attachment surface 126 includes an outer rim around the circumference of the carrier 122 so that the air is sealed within the channels 124 and forced through the porous media 116. The channels 124 are connected to the source of positive pressure through a central opening 128 which passes through the centre of the carrier 122. The channels 124 are contiguous and form a single continuous channel 124 in fluid communication with the central opening 128 of the carrier 122. The air bearing 114 also comprises a conduit 130 connected to the carrier 122 which houses a passageway for air to enter the central opening 128 of the carrier 122 and pass into the channels 124. The conduit 130 has an outer surface with a hexagonal cross-sectional shape, but other shapes are possible.

FIG. 4B shows the air bearing 114 of FIG. 4A with the porous media 116 applied. In the first embodiment, the porous media 116 is formed of carbon, in particular sintered carbon. The porous media 116 is applied over the carrier 122. The porous media 116 is applied to the attachment surface 126 via adhesive so that a space is formed by the channels 124 for distribution of air from the central opening 128 across the porous media 116. To provide this, the lower surface of the porous media 116 is planar so that the channels 124 form spaces between the lower surface of the porous media 116 and the surface of the carrier 122. The porous media 116 has the same diameter as the diameter of the carrier 122.

As described above, the air bearing 114 has an upper surface 118. In particular, the upper surface 118 is the uppermost surface of the porous media 116. The upper surface 118 is the surface exposed at the upper surface 102. As the porous media 116 is porous to air, the air in the channels 124 permeates through the porous media 116 to the upper surface 118. This then generates an air cushion between the upper surface 118 of the porous media 116 at the upper surface 102 and the underside of the conveyor belt.

As described above, the air bearing 114 has a slit 120. The slit 120 is arranged in the upper surface 118 of the porous media 116. The slit 120 extends through the centre of the porous media 116 across the diameter. The slit 120 has a depth less than the thickness of the porous media 116. The slit 120 reduces the pressure at the central location.

Figure 5:
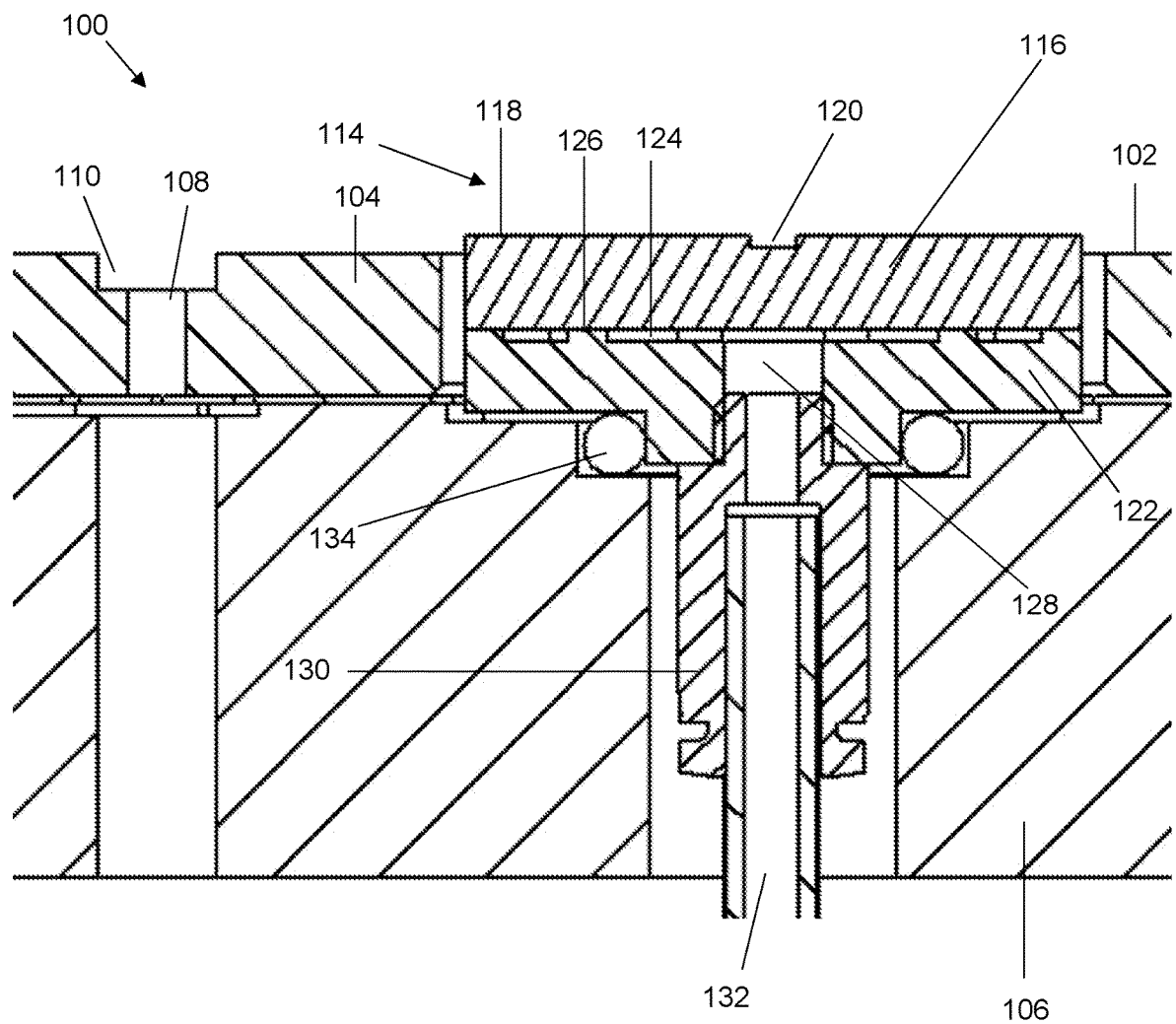
FIG. 5 shows a perspective view through a cross section of the support unit for the substrate support system according to the first embodiment of the present disclosure.

Referring to FIG. 5, the air bearing 114 of FIGS. 4A and 4B is shown applied to the support unit 100 according to the first embodiment. The support unit 100 comprises an upper surface 102 which comprises the upper surface of a plate 104 arranged on a mount 106. The upper surface 102 contains slots 110 which define vacuum apertures 108 provided to supply a negative pressure to a substrate mounted on a conveyor belt arranged above the upper surface 102. The support unit 100 also comprises an air bearing 114. The air bearing 114 is arranged through a recess in the plate 104. As described above, the air bearing 114 has a porous media 116 with an upper surface 118. The upper surface 118 of the porous media 116 is arranged above the upper surface 102 and thus the upper surface of the plate 104. In the first embodiment, the upper surface 118 of the air bearing 114 is arranged 150 μm above the upper surface 102. This spaces the underside of the conveyor belt from the upper surface 102 to avoid contact in the event of slight sagging of the belt. This means the air cushion is provided at the upper surface 118 of the air bearing 114 spaced above the upper surface 102 of the support unit 100. In this way, the conveyor belt is supported above the upper surface 102 to avoid contact. In the first embodiment, with a belt thickness of 0.8 mm and a pitch of 60 to 65 mm between air bearings 114, the belt does not sag enough to touch the upper surface 102 when the spacing between the upper surface 118 of the air bearings 114 and the upper surface 102 of the support unit 100 is 150 μm.

The air bearing 114 has a slit 120 in the upper surface 118 of the porous media 116. The slit 120 is shown aligned with the slots 110 of the vacuum apertures 108, which reduces the positive pressure in the region aligned with the row of vacuum apertures 108.

The air bearing 114 has a carrier 122, which defines channels 124 for distributing air to the porous media 116, and an attachment surface 126 for attaching the porous media 116 to the carrier 122. The carrier 122 has a central opening 128 which connects the channels 124 to a passageway passing through a conduit 130 which extends down from the carrier 122. The conduit 130 has a connection opening 132 at the base, which is at the opposing end of the conduit 130 to the carrier 122. The connection opening 132 is connected to the central opening 128 by the passageway. The connection opening 132 is connectable to a source of positive pressure, such as an air pump, and may be connected by further conduits or pipes and connectors as necessary.

In use, the source of positive pressure can apply a positive pressure in the form of an airflow, which can pass through the connection opening 132, through the passageway of the conduit 130, through the central opening 128, through the channels 124, and through the porous media 116 to the upper surface 118 of the air bearing 114 in order to provide a cushion of air above the upper surface 102, between the upper surface 118 of the air bearing 114 and the underside of the conveyor belt.

The air bearing 114 is arranged through a recess in the plate 104, and the carrier 122 is mounted on a shoulder defined by the mount 106. The conduit 130 of the air bearing 114 is arranged through a hole in the mount 106 which is connected to the recess in the plate 104 so that the air bearing 114 can be mounted within the plate 104 and the mount 106.

The upper surface 118 of the air bearing 114 is arranged above the upper surface of the plate 104. This means that the air cushion is provided at a position in the z direction that means the conveyor belt is supported at a position slightly above the upper surface 102. In the first embodiment, the height of the air cushion in the z direction is around 3 to 10 μm, and the height of the upper surface 118 of the air bearing 114 above the upper surface 102 of the support unit 100 is 150 μm. This disposes the conveyor belt slightly away from the elements of the upper surface 102 such as the upper surface of plate 104 and the upper surface 118 of the porous media 116.

If the air bearing 114 is not properly aligned with the upper surface 102, and for example is at a slight angle with respect to the x-y plane, then the air cushion will not be parallel to the upper surface 102. This means that the conveyor belt would not actually be supported on the air cushion, but instead will be supported by the surface of the air bearing 114 itself, for example by contacting and resting on an edge part of the porous media 116. This can lead to wear between the air bearing 114 and the conveyor belt. Especially where the porous media 116 is particularly hard this can damage the conveyor belt or melt the air bearing.

To mitigate this problem with aligning the air bearings 114, a resilient member 134 is provided. In the first embodiment, the resilient member 134 is an O-ring. The resilient member 134 is made from a material which is deformable. For example, the resilient member 134 may be made from an elastic material such as rubber. The resilient member 134 is arranged between the air bearing 114 and the mount 106. In particular, the resilient member 134 is arranged between an underside of the carrier 122 and the shoulder of the mount 106 on which the carrier 122 rests. In this way, the carrier 122 is supported on the mount 106 by the resilient member 134. Under the weight of the air bearing 114, the resilient member 134 can deform. This provides a mechanism for automatically self-aligning the air bearing 114. This can be used to conform the array of air bearings 114 to the topology of the conveyor belt. In other examples, the resilient member 134 is not required. In some cases, if the air bearing 114 is made from a relatively soft material, for example graphite, then if the air bearing 114 is not properly aligned, the raised portions of the air bearing 114 can wear down so that it then becomes aligned over time after movement of the conveyor belt. Such air bearings 114 can be provided with or without the resilient member 134.

Figure 6A:
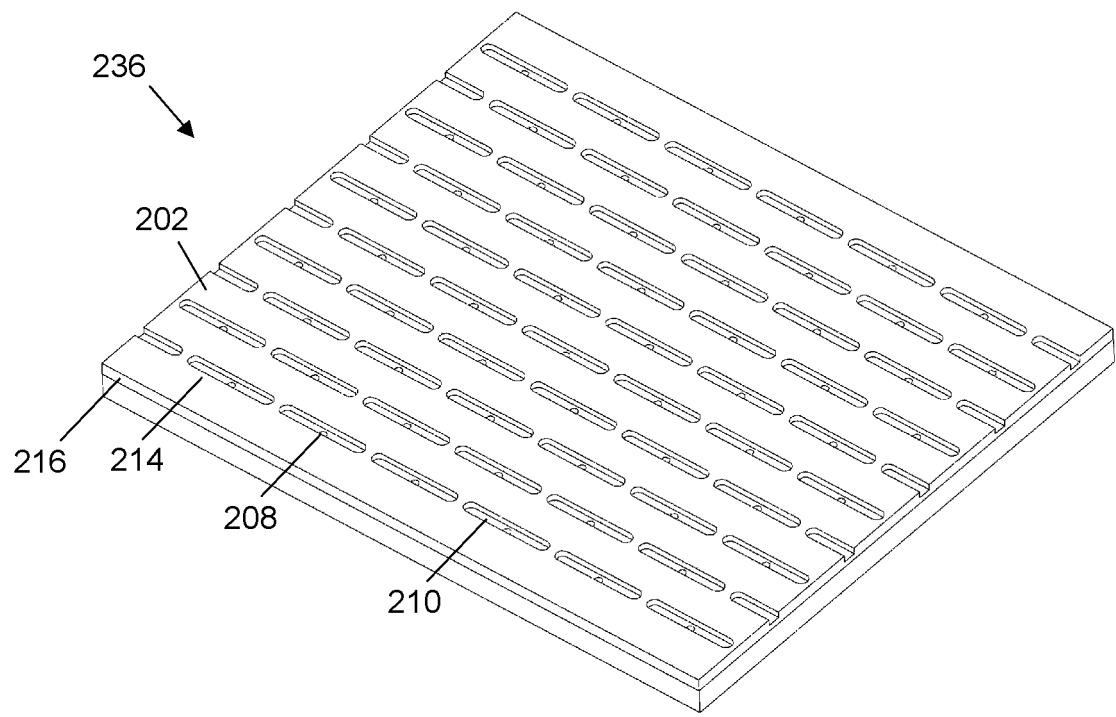
FIG. 6A shows a perspective view of a tile for the substrate support system according to a second embodiment of the present disclosure.
Figure 6B:
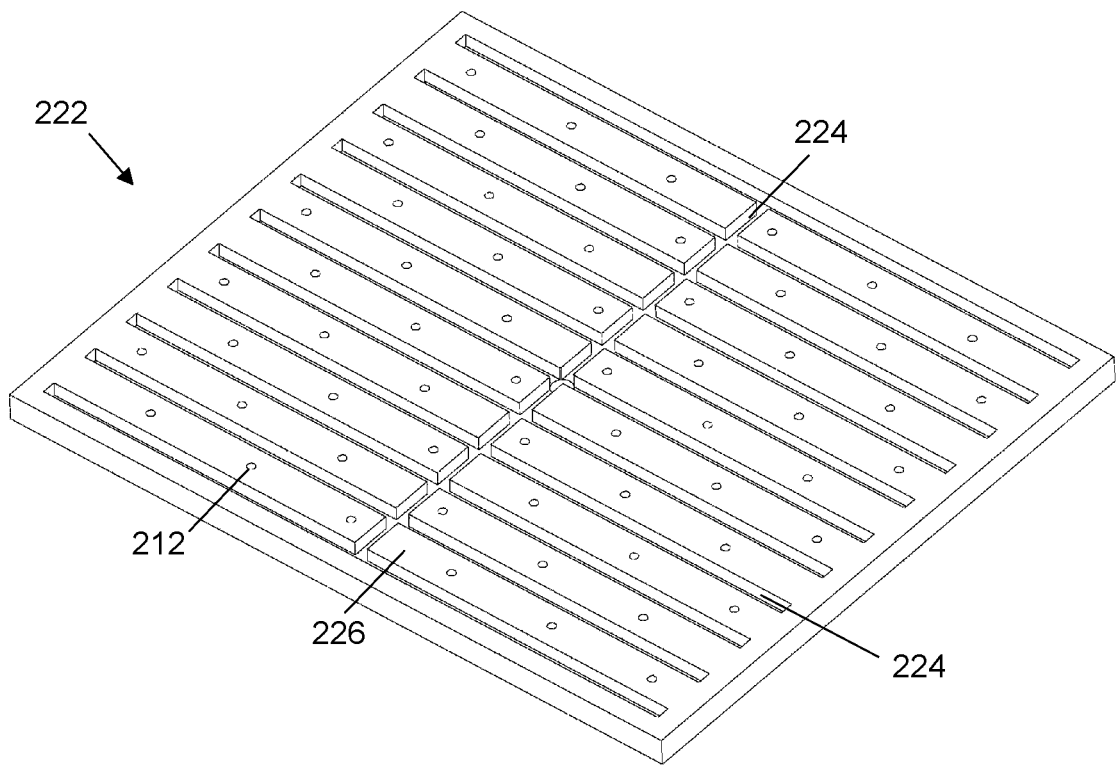
FIG. 6B shows a perspective view of a carrier for the tile of FIG. 6A.

Referring to FIGS. 6A and 6B, a tile 236 is provided for a substrate support system 20 according to a second embodiment of the present disclosure. Referring to FIG. 6A, the tile 236 defines the upper surface 202. In particular, an upper surface of the tile 236 defines the upper surface 202. In this manner, the tile 236 replaces the plate 104 of the first embodiment. The tile 236 forms the support unit 200 for supporting the conveyor belt.

The tile 236 comprises a plurality of vacuum apertures 208. The vacuum apertures 208 are in the upper surface 202 because they are arranged in the upper surface of the tile 236. The vacuum apertures 208 of the second embodiment may be similar to the vacuum apertures 108 of the first embodiment. In a similar manner to the first embodiment, the vacuum apertures 208 are provided in the form of a plurality of slots 210. The slots 210 extend through the thickness of the tile 236 so that fluid communication between the upper surface of the tile 236 defining the upper surface 202 and the underside of the tile 236 can be established. The slots 210 are elongate and in a stadium shape and are arranged in rows extending in the y direction. In other examples, the slots 210 can extend through part of the thickness of the tile 236 and comprise a hole at the base of the slot 210 in a similar manner to the first embodiment. The slots 210 may extend in the direction of movement of the conveyor belt, so that belt apertures will sequentially align with slots 210 along the row. The vacuum apertures 208 are offset which can help maintain tension in the belt by forcing the belt to deform into a complex shape, as adjacent vacuum apertures 208 in adjacent rows are not aligned, so the hold-down force is not applied along a continuous line across the belt.

The tile 236 itself acts as an air bearing 214. As such, the tile 236 does not comprise the individual air bearings 114 of the first embodiment. The tile 236 is the air bearing 214 because the tile 236 comprises porous media 216. In particular, the tile 236 is formed from porous media 216 so that the regions of the tile 236 around the slots 210 are formed of porous media 216. In the second embodiment, the porous media 216 is formed of carbon, in the form of sintered carbon. The porous media 216 may be the same as the porous media 116 of the air bearing 114 of the first embodiment. Because the whole tile 236 is porous, the tile 236 as a whole can then diffuse air from below the tile 236 to the upper surface and provide an air cushion for supporting the conveyor belt. The upper surface of the porous media 216 is therefore inherently arranged at the upper surface 202 because this defines the upper surface of the tile 236. In the second embodiment, the upper surface 202 consists of the upper surface of the porous media 216 of the air bearing 214. In this way, there are no other elements of the upper surface 202 on which the conveyor belt can rest, so that the conveyor belt is supported on the air bearing 214 to reduce friction.

Because there are no individual air bearings 114 through the tile 236 (unlike the plate 104 of the first embodiment), there is no need to interrupt the rows of slots 210. As such, the slots 210 can be uniformly and evenly distributed over the upper surface of the tile 236, which further improves the uniformity of the vacuum force delivered.

In this way, the tile 236 forms a single large air bearing 214. In other words, the tile 236 provides the at least one air bearing 214 of the support unit 200. Instead of providing an array of individual air bearings 114 over the upper surface 102 in the first embodiment, the entire tile 236 of the second embodiment is formed of porous media 216 so that the tile 236 acts as a continuous air bearing 214 over the upper surface 202. This removes the need for a plate 104 with recesses and individual air bearings 114 to be mounted therein. This makes the assembly much cheaper and simpler. The area of porous media 216 is also much larger than is possible with individual air bearings 114, meaning that the pressure can be much lower and the force can be much higher. This also reduces cost and provides a simpler arrangement because a plurality of individual air bearings 114 are not required.

Referring to FIG. 6B, a carrier 222 is provided for use with the tile 236 of FIG. 6A. In particular, the carrier 222 is for supporting the tile 236. The carrier 222 replaces the carrier 122 of the first embodiment. Specifically, the carrier 222 is provided to support an underneath of the tile 236 and arranged to provide the air to the porous media 216 of the tile 236. Thus, in use, the tile 236 is arranged over the carrier 222.

The carrier 222 has generally the same shape as the tile 236. In the second embodiment, the carrier 222 and the tile are both square. The tile 236 has a surface area of around 300 mm2. The tile 236 is arranged to be placed on the carrier 222. In the first embodiment, the carrier 222 is made from metal, in particular aluminium, but may be made from other materials in other examples.

The carrier 222 has channels 224 having a similar function to the channels 124 of the first embodiment. The carrier 222 comprises an attachment surface 226 having a similar function to the attachment surface 126 of the first embodiment. The carrier 222 has vacuum openings 212 similar to the vacuum openings 112 of the first embodiment.

The channels 224 comprise a central channel 224 through the centre of the carrier 222 extending in the x direction. The central channel 224 is connected to a plurality of channels 224 which extend in the y direction between adjacent rows of vacuum openings 112. The channels 224 are provided to distribute the air from a source of positive pressure over the underside of the tile 236 so that is diffuses through the porous media 216 to form an air cushion on the upper surface 202.

The attachment surface 226 is for supporting the underside of the tile 236. The underside of the tile 236 is attached to the carrier 222 at the attachment surface 226, for example by adhesive. The attachment surface 226 is arranged between the channels 224 and around the vacuum openings 212.

The vacuum openings 212 are arranged to couple the slots 210 of the tile 236 to a source of negative pressure for providing the vacuum force of the vacuum apertures 208. When the tile 236 is arranged on the carrier 222, the slots 210 align with the vacuum openings 212 so that the vacuum openings 212 are arranged at the base of the slots 210 in a similar manner to the vacuum openings 112 of the first embodiment. When the tile 236 is arranged on the carrier 222, the slots 210 do not align with or overlap the channels 224. In other words, the slots 210 of the tile 236 are arranged between, and offset from, adjacent channels 224. In this way, the positive pressure from the channels 224 is provided to the porous media 216, while the negative pressure from the vacuum openings 212 acts on the slots 210.

In the same manner as the first embodiment, the slots 210 form the upper part of the vacuum apertures 108. The opening of the slots 210 in the upper surface of the tile 236 are thus aligned in the upper surface 202. The slots 210 thus convey the negative pressure from the vacuum openings 212 to the upper surface 202 and thus to the substrate through belt apertures in the conveyor belt. In other embodiments, to further avoid the vacuum reducing the efficiency of the positive pressure through the porous media 216 around the slots 210, the internal surface of the slots 210 may be coated with a non-porous material to avoid air diffusing from the porous media 216, through the sides of the slots 210, and into the slots 210. In other examples, the tile 236 may be made entirely of porous media 216 to reduce manufacturing costs and complexity.

The tile 236 also increases the effective area of the air bearings 214 in the upper surface 202. Over 50% of the area of the upper surface 202 may be covered in porous media 216 by using the tile 236. This is much higher than the 5 to 20% of the first embodiment. This increases the potential force, and enables a more precise air cushion to be provided to the conveyor belt, achieving the desired lift. Due to the increase in coverage, spots of high positive pressure due to individual air bearings 114 are eliminated. This can otherwise cause the conveyor belt to lift up at these regions and mean the conveyor belt does not run flat, causing issues with alignment and thus printing. As such, the second embodiment provides a further improvement in supporting the conveyor belt on an air bearing 214.

The tile 236 can then be used in the same arrangement as the first embodiment in place of the air bearings 114. In some embodiments, a plurality of tiles 236 may be provided joined together to form a surface on which the conveyor belt can be supported. An array of tiles 236 and the carriers 222 can be used to provide the support unit 200. The slots 210 and the vacuum openings 212 can then be aligned with a connection to the source of negative pressure for applying the negative pressure to the substrate through the slots 210. The channels 224 of the carrier 222 can then be connected to a source of positive pressure to apply the positive pressure to the porous media 216 of the tile 236 to form the air cushion on the upper surface 202. The tile 236 can then be used as part of the substrate support system 20 for a conveyor printer in the same way as described above in relation to the first embodiment.

Features of the first embodiment may be readily applied to the second embodiment. For example, one or more resilient members 130 may be used to support the tile 236 or the carrier 222 and align the upper surface of the tile 236 correctly. In another example, slits 120 may be provided in the air bearing 216 aligned with the rows of slots 210. In another example, the vacuum openings 212 may have a similar arrangement to the vacuum openings 112 of the first embodiment.

In one embodiment, the support unit 100, 200 may provide a plurality of vacuum apertures 108, 208 and at least one air bearing 114, 214 as part of a substrate support system 10, 20 which is used for a printer other than a conveyor printer. For example, the printer may be a flat-bed printer. A flat-bed printer may have a printer table on which a substrate is to be printed by moving a printhead over the substrate. In this case, the upper surface 102 is for supporting the substrate directly, rather than supporting the conveyor belt. The air bearings 114, 214 provide a positive pressure which can be used, for example, to release the substrate after printing. The vacuum apertures 108, 208 provide a negative pressure to hold down the substrate onto the upper surface 102, 202 in a similar way as the first and second embodiments, except that the vacuum apertures 108, 208 apply the pressure directly to the substrate rather than through belt apertures in a conveyor belt. In such cases, as the air bearings 114, 214 are not used to reduce friction, the air bearings 114, 214 need not be arranged to protrude from the upper surface 102, and instead may be flush with the upper surface 102 to avoid wear with the substrate when the air bearings 114, 214 are not in use.

Figure 7:
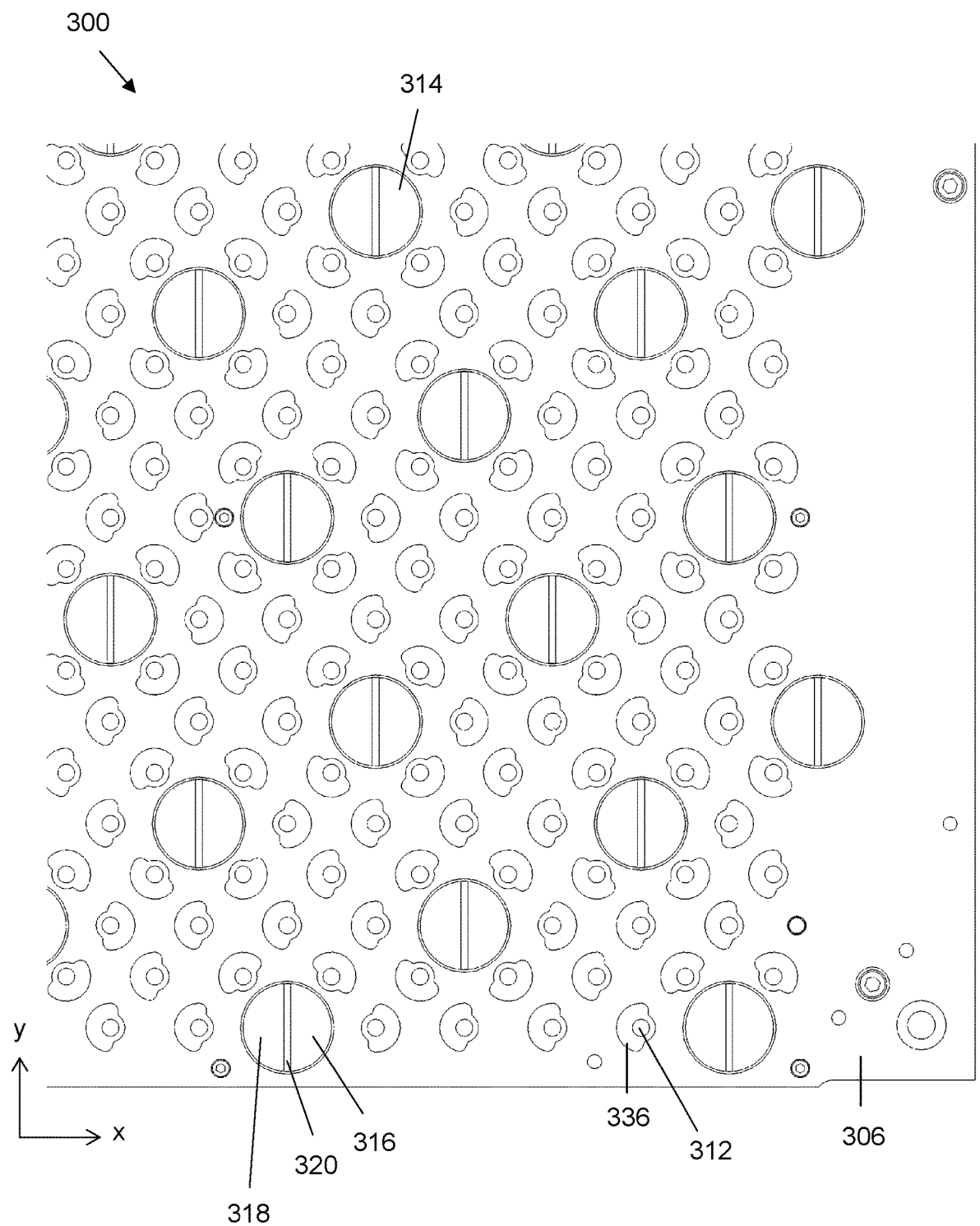
FIG. 7 shows a perspective view of a support unit for a substrate support system according to a third embodiment of the present disclosure, without a sheet applied.
Figure 8:
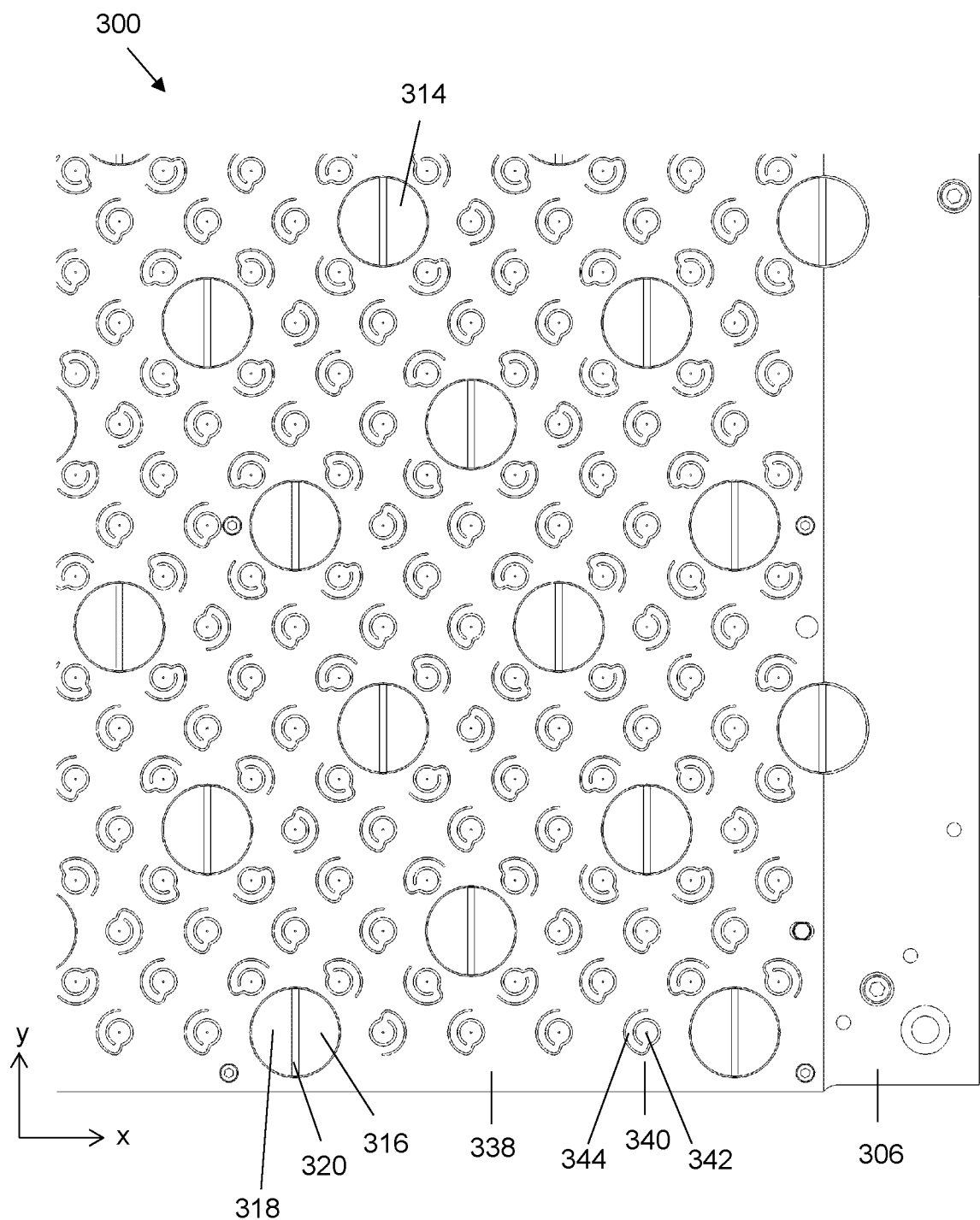
FIG. 8 shows a perspective view of the support unit of FIG. 7, with a sheet applied.

Referring to FIGS. 7 and 8, a support unit 300 for use in a substrate support system 30 according to a third embodiment is provided. The support unit 300 of the third embodiment is identical to the support unit 100 of the first embodiment, except where provided below. Specifically, the support unit 300 differs from the support unit 100 of the first embodiment in that the support unit 300 comprises a sheet 338. FIG. 7 shows the support unit 300 without the sheet, and FIG. 8 shows the sheet 338 applied. Corresponding reference numerals are used to indicate identical features of the first embodiment, unless explained otherwise.

In FIG. 7, the plate 308 is also removed, exposing the upper surface of the mount 306. The support unit 300 comprises a plurality of vacuum openings 312 arranged in the surface of the mount 306 for connection to the vacuum apertures 308 as described above. The vacuum opening 312 are identical to the vacuum openings 312 described in relation to the first embodiment. The vacuum apertures 312 are arranged in an array in rows across the surface. The particular arrangement of the array of vacuum apertures 312 is not essential, and may be varied in different embodiments.

The support unit 300 also comprises a plurality of air bearings 314 made of porous media 316 and having an upper surface 318 arranged above the upper surface 302. The air bearings 314 are identical to the air bearings 114 of the first embodiment. The particular arrangement of the array of air bearings 314 is not essential, and may be varied in different embodiments.

The support unit 300 also comprises a plurality of pockets 336. The pockets 336 are in the form of recesses in the upper surface of the mount 306. In particular, the pockets 336 extend into the thickness of the mount 306. In the third embodiment, the pockets 336 are milled into the mount 306. In other examples, the pocket 336 may be drilled or otherwise machined. In an alternative embodiment, the pockets 336 can be provided in a separate sheet in addition to the sheet 338. Forming the counterbore of the pocket 336 and controlling the depth of cut is difficult compared to simply drilling a through-hole such as the vacuum opening 312. Instead, by using a sheet containing these pockets 336, the milling step can be avoided. Forming the pocket 336 in a sheet increases the ease of manufacture and reduces cost. The flexibility is also increased as different shaped pockets 336 can easily, cheaply, and quickly be produced. The sheet of the pockets 336 can then be used alongside the sheet 338 of valves to form a stack of sheets. The pockets 336 may be cut into the sheet, such as by laser cutting.

In the third embodiment, the pockets 336 are aligned with the vacuum openings 312. Each vacuum opening 312 has a corresponding pocket 336. The pockets 336 are provided around the vacuum openings 312 so that the vacuum opening 312 is arranged within the pocket 336 and at the base of the pocket 336. The pocket 336 therefore provides a recessed volume between the vacuum opening 312 and the upper surface of the mount 306. The pocket 336 is connected to a source of negative pressure through the vacuum opening 312. Thus, the vacuum openings 312 are arranged in a plane below and parallel to the upper surface.

Referring to FIG. 8, a sheet 338 is provided over the upper surface of the mount 306. The sheet 338 is made from a resilient material. In the third embodiment, the sheet 338 is made from biaxially-oriented polyethylene terephthalate (BoPET), also known by the trade name Mylar®. In other examples, other materials may be used, such as polyimide e.g. Kapton®, styrene, polyvinyl chloride (PVC), or polycarbonate. The sheet 338 has a plurality of valves 340 formed in the sheet 338. The valves 340 are cut into the sheet 338, such as by laser cutting. The process forms cut-outs which define the valves 340. Thus, the valves 340 are integral with the sheet 338 and form part of the sheet 338. Thus, the sheet 338 provides an array of valves 340.

The sheet 338 lies over the pockets 336. The pockets 336 are configured to receive valves 340 of the sheet 338. The valves 340 are provided for opening and closing the vacuum openings 312. The valves 340 each comprise a valve head 342 which is configured to seal the vacuum opening 312. In the third embodiment, the valve head 342 is circular. The valves 340 also each comprise a valve lever arm 344 attached to the valve head 342. The valve lever arm 344 is configured to permit the valve head 342 to move to open and close the vacuum opening 312. In particular, the valve lever arm 344 permits the valve head 342 to move out of the plane of the sheet 338 and towards the vacuum opening 312 arranged below the sheet 338. This is achieved by the valve lever arm 344 bending to permit the movement. The valve lever arm 344 has a curved shape around the side of the valve head 342 which provides a length in a compact space. This allows the packing density of the valves 340 to be increased. The length permits the valve head 342 to be arranged in a plane parallel to the plane of the sheet 338 so that the valve head 342 can lie flat against the vacuum opening 312 to form a tight seal. In other examples, the valves 340 have a different shape. For example, the valves 340 may have a straight valve lever arm 344, but this would be less compact than the third embodiment.

FIG. 7 shows that each pocket 336 has a particular shape for receiving the shape of the valve 340. In particular, the pocket 336 has a first portion having a generally semicircular shape for receiving the valve head 342. The first portion is arranged at one side of the pocket 336. The pocket 336 also has a second portion having a generally semicircular shape which has a diameter larger than the first portion. The second portion is for receiving the valve lever arm 344. The second portion is arranged at the opposite side of the pocket 336 to the first portion. In this way, the pocket 336 provides a shape complementary to the shape of the valve 340. The pocket 336 provides a space for the valve 340 to be arranged, in particular so that the valve lever arm 344 can bend and the valve head 342 can extend into the pocket 336 to seal against the vacuum opening 312. In other examples, the shape of the pocket 336 can be different to accommodate the shape of different valves 202.

FIG. 7 shows an array of pockets 336 with some pockets 336 arranged at different orientations. This is provided to further increase the packing density. The particular arrangement can depend on the shape of the valves 340. In the arrangement of FIG. 8, the array of vacuum openings 312 is positioned around the air bearings 314 to accommodate the air bearings 314. The orientation of the pockets 336 is also selected to improve compactness by arranging the pockets 336 around the air bearings 314. In other examples, the arrangement may be changed, and for example the orientation may be uniform with each pocket 336 oriented in the same direction.

In the third embodiment, the sheet 338 has holes for receiving the air bearings 314, so that the air bearings 314 can act through the sheet 338. In embodiments where the pockets 336 are formed in a sheet, that sheet may also comprise holes for the air bearings 314 to pass through.

In use, when the negative pressure is applied to the vacuum openings 312 in the same way as the first embodiment when no substrate is present over the vacuum openings 312, the valve head 342 is pulled downwards into the pocket 336 and into contact with the vacuum opening 312 to close the valve 340. In particular, a pressure differential is generated between the atmospheric pressure due to the open valve 340 between a region above the sheet 338 and the vacuum opening 312 through the cut-outs in the valve 340. This causes an air drag force on the valve head 342, pulling the valve head 342 downwards to the vacuum opening 312 due to the negative pressure. The valve head 342 and the valve lever arm 344 are located in the pocket 336 so that they have space to move out of the plane of the sheet 338. The valve head 342 contacts the vacuum opening 312 and forms a seal, closing the valve 340. This allows vacuum openings 312 that are not covered by a substrate to be closed, improving the effectiveness of the vacuum. This avoids the need for masking. This also provides a simple array of valves, which simple, fast, and cheap to manufacture and apply.

When a substrate is present over the vacuum openings 312, the pressure equalizes and the valve 340 opens as the valve head 342 returns to the plane of the sheet 338 due to the tension in the bent valve lever arm 344. This allows the negative pressure at the vacuum openings 312 to act on the substrate to retain it in place on the upper surface 302.

Once the sheet 338 is applied to the mount 306, the plate 304 can then be applied. The plate 304 is identical to the plate 104 of the first embodiment. Thus, the plate 304 can be applied and provides the upper surface 302. The support unit 300 then appears similar to as shown in FIG. 1. The plate 304 is arranged over the sheet 338 and thus over the upper surface of the mount 306. The plate 304 defines a plurality of vacuum apertures 308 in the form of a plurality of slots 310. The slots 310 are connected, via the valves 340, to the vacuum openings 312. As such, when the valves 340 are open, the vacuum openings 312 are in fluid communication with the vacuum apertures 308. Thus, when the valves 340 are open, the negative pressure applied to the vacuum openings 312 is transmitted through the valves 340 to the vacuum apertures 308.

A substrate placed over the conveyor belt can then be held down by the vacuum pressure. As mentioned above, when a substrate passes over a vacuum opening 312, the valve 340 opens to allow the negative pressure to act on the substrate through the slots 310 and through the belt apertures. After the substrate passes further along the conveyor belt and no longer covers the vacuum opening 312, the valve 340 automatically closes due to the pressure differential. This improves the vacuum force across the array as a whole without requiring masking. This makes it particularly useful for a conveyor belt system as the substrate continually moves over different vacuum openings 312, and thus it is not possible to mask uncovered vacuum openings 312.

As such, the third embodiment provides a particularly preferred arrangement for a conveyor printer. The air bearings 314 provide a cushion of air for supporting the conveyor belt above the upper surface 302, while the vacuum apertures 308 and the valves 340 in the sheet 338 retain the substrate in position while improving the vacuum effectiveness. Together, these features synergistically contribute to providing an improved vacuum conveyor which improves alignment and thus print quality.

In another embodiment, the substrate support system 10 of the first embodiment or the substrate support system 20 of the second embodiment may be provided with a set of valves for sealing the vacuum openings 112, 212 in a different manner than the sheet 338 of the third embodiment. For example, the valves may comprise ball valves in each vacuum aperture 108, 208 for self-sealing the vacuum aperture 108, 208 when no substrate is placed over the vacuum aperture 108, 208. However, the valves of the third embodiment are advantageous as the sheet 338 is simple, cheap, and fast to produce, prototype, and replace, and avoids complexity of having individual valves such as ball and springs for each vacuum aperture 108, 208.

In an alternative embodiment, the sheet 338 of the third embodiment may be applied to a support unit 300 comprising the tile 236 of the second embodiment instead. Thus, the sheet 338 may be provided between the carrier 222 and the tile 236 in order to open and close the vacuum openings 212. Otherwise, operation of this can be similar to as described in relation to the third embodiment.

The invention claimed is:

1. A substrate support system for a conveyor printer, comprising:
   a support unit comprising:
      a plurality of vacuum apertures arranged for fluidic communication with a source of negative pressure; and
      at least one air bearing arranged for fluidic communication with a source of positive pressure, wherein the air bearing comprises porous media; and
   a conveyor belt arranged over the support unit for supporting a substrate to be printed on, the conveyor belt comprising a plurality of belt apertures;
   wherein the vacuum apertures are arranged to convey a negative pressure through the belt apertures for retaining the substrate on the conveyor belt; and
   wherein the at least one air bearing is arranged to convey a positive pressure to support the conveyor belt.

2. The substrate support system according to claim 1, wherein the porous media comprises carbon.

3. The substrate support system according to claim 1, wherein the at least one air bearing is configured to support the conveyor belt on a film of air having a thickness of between 1 μm and 20 μm.

4. The substrate support system according to claim 1, wherein the source of negative pressure is configured to apply a negative pressure of −100 mbarg to −250 mbarg to the vacuum apertures.

5. The substrate support system according to claim 1, wherein the source of positive pressure is configured to apply a positive pressure of 0.4 MPa to 0.6 MPa to the at least one air bearing.

6. The substrate support system according to claim 1, wherein a ratio of the flow rate of the negative pressure to the flow rate of the positive pressure is greater than 500 to 1.

7. The substrate support system according to claim 1, wherein the at least one air bearing is supported on a resilient member.

8. The substrate support system according to claim 1, wherein the at least one air bearing has an upper surface arranged above an upper surface of the support unit.

9. The substrate support system according to claim 8, wherein the at least one air bearing is arranged to protrude above the upper surface of the support unit by between 100 μm and 200 μm.

10. The substrate support system according to claim 8, wherein the upper surface of the at least one air bearing is circular.

11. The substrate support system according to claim 8, wherein the upper surface of the at least one air bearing comprises a slit.

12. The substrate support system according to claim 1, wherein the at least one air bearing comprises a plurality of air bearings arranged in an array.

13. The substrate support system according to claim 12, wherein each of the plurality of air bearings cover an area of an upper surface of the support unit of between 250 mm$^2$ and 750 mm$^2$.

14. The substrate support system according to claim 12, wherein the plurality of air bearings comprise at least 200 air bearings per m$^2$ of the area of an upper surface of the support unit.

15. The substrate support system according to claim 1, wherein the support unit comprises at least one tile comprising porous media forming the at least one air bearing.

16. The substrate support system according to claim 1, wherein the plurality of vacuum apertures each comprise a slot in an upper surface of the support unit and a vacuum feed hole in the base of the slot, wherein the vacuum feed hole is connected to the source of negative pressure.

17. The substrate support system according to claim 16, wherein the slots of the vacuum apertures extend in a direction parallel to a direction of movement of the conveyor belt.

18. The substrate support system according to claim 1, further comprising a plurality of valves operable to open and close the plurality of vacuum apertures.

19. The substrate support system according to claim 1, further comprising a sheet comprising:
   a plurality of valves formed into the sheet;
   wherein the sheet is made from a resilient material; and
   wherein each valve comprises a valve head for sealing a respective vacuum aperture in the substrate support unit, and a valve lever arm for permitting movement of the valve head towards and away from the vacuum aperture in order to open and close the valve.

20. A method for using a substrate support system for a conveyor printer, comprising:
   providing a support unit comprising:
      a plurality of vacuum apertures arranged for fluidic communication with a source of negative pressure; and
      at least one air bearing arranged for fluidic communication with a source of positive pressure, wherein the air bearing comprises porous media; and
   a conveyor belt arranged over the support unit for supporting a substrate to be printed on, the conveyor belt comprising a plurality of belt apertures;
   wherein the vacuum apertures are arranged to convey a negative pressure through the belt apertures for retaining the substrate on the conveyor belt; and
   wherein the at least one air bearing is arranged to convey a positive pressure to support the conveyor belt;
   placing a substrate on the conveyor belt;
   applying, by the source of negative pressure, a negative pressure to the plurality of vacuum apertures to retain the substrate on the conveyor belt; and
   applying, by the source of positive pressure, a positive pressure to the at least one air bearing to support the conveyor belt.

* * * * *

UNITED STATES PATENT AND TRADEMARK OFFICE
CERTIFICATE OF CORRECTION

PATENT NO. : 11,981,512 B2  
APPLICATION NO. : 17/720597  
DATED : May 14, 2024  
INVENTOR(S) : Andrew James Brown Page 1 of 1

It is certified that error appears in the above-identified patent and that said Letters Patent is hereby corrected as shown below:

On the Title Page

Item (73) Assignee, Please change "Inca Digital Printers Limited, Cambridge (GB)" to --AGFA NV, Mortsel (BE)--.

Signed and Sealed this
First Day of April, 2025

Coke Morgan Stewart
*Acting Director of the United States Patent and Trademark Office*